US011868446B2

(12) United States Patent
Lee

(10) Patent No.: US 11,868,446 B2
(45) Date of Patent: Jan. 9, 2024

(54) METHOD OF OPERATING NEURAL NETWORK MODEL USING DRM PACKAGE AND METHOD OF PROCESSING DATA USING THE SAME

(71) Applicant: Samsung Electronics Co., Ltd., Suwon-si (KR)

(72) Inventor: Jonghyuk Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 191 days.

(21) Appl. No.: 17/346,682

(22) Filed: Jun. 14, 2021

(65) Prior Publication Data

US 2022/0138284 A1    May 5, 2022

(30) Foreign Application Priority Data

Nov. 3, 2020   (KR) .................. 10-2020-0145260

(51) Int. Cl.
*H04L 29/06*   (2006.01)
*G06F 21/10*   (2013.01)
*G06F 21/60*   (2013.01)
*G06N 3/063*   (2023.01)

(52) U.S. Cl.
CPC ............ *G06F 21/10* (2013.01); *G06F 21/602* (2013.01); *G06N 3/063* (2013.01); *G06F 21/107* (2023.08)

(58) Field of Classification Search
CPC ................... G06F 21/10; G06F 21/602; G06F 2221/0753; G06N 3/063
See application file for complete search history.

(56) References Cited

U.S. PATENT DOCUMENTS

| 9,430,619 | B2 | 8/2016 | Wu et al. | |
| 10,902,133 | B2* | 1/2021 | Williams | ............ G06F 21/6245 |
| 11,341,281 | B2* | 5/2022 | Skourtis | .................. G06F 21/74 |
| 11,489,659 | B2* | 11/2022 | Cheung | ................. H04L 9/3066 |
| 2014/0298026 | A1* | 10/2014 | Isozaki | ................. H04L 9/0897 |
| | | | | 713/171 |
| 2017/0005790 | A1* | 1/2017 | Brockmann | .......... H04L 9/0897 |
| 2017/0270308 | A1 | 9/2017 | Nakayama et al. | |
| 2020/0019697 | A1* | 1/2020 | Shen | ................... G06F 21/6209 |
| 2020/0128307 | A1 | 4/2020 | Li | |

(Continued)

FOREIGN PATENT DOCUMENTS

| CN | 105022835 A | 11/2015 |
| CN | 110569967 A | 12/2019 |

(Continued)

*Primary Examiner* — Shin-Hon (Eric) Chen
(74) *Attorney, Agent, or Firm* — HARNESS, DICKEY & PIERCE, P.L.C.

(57) ABSTRACT

In a method of operating a neural network model, neural network model data and raw data are received during a non-secure mode. The neural network model data is encrypted by digital rights management (DRM). An operation mode is changed from the non-secure mode to a secure mode based on the receiving the neural network model data and the raw data. The neural network model is executed during the secure mode based on decrypted neural network model data that is obtained by decrypting the neural network model data encrypted by the DRM. The inference operation is performed on the raw data during the secure mode using the neural network model.

17 Claims, 18 Drawing Sheets

(56) References Cited

U.S. PATENT DOCUMENTS

| | | | |
|---|---|---|---|
| 2020/0143016 A1 | 5/2020 | Borkar et al. | |
| 2021/0266329 A1* | 8/2021 | Fuhry | G06F 21/604 |
| 2021/0273921 A1* | 9/2021 | Kumar | H04L 63/06 |
| 2021/0357526 A1* | 11/2021 | Yekhanin | H04L 9/0894 |

FOREIGN PATENT DOCUMENTS

| | | |
|---|---|---|
| KR | 10-2017-0056613 A | 5/2017 |
| KR | 10-2019-0072450 A | 6/2019 |

\* cited by examiner

METHOD OF OPERATING NEURAL NETWORK MODEL USING DRM PACKAGE AND METHOD OF PROCESSING DATA USING THE SAME

CROSS-REFERENCE TO RELATED APPLICATION

This application claims priority under 35 USC § 119 to Korean Patent Application No. 10-2020-0145260 filed on Nov. 3, 2020 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of operating neural network models using digital rights management (DRM) packages, and methods of processing data using the methods of operating the neural network models.

2. Description of the Related Art

In computer science, artificial intelligence (AI), sometimes called machine intelligence, is intelligence demonstrated by machines, in contrast to the natural intelligence displayed by, for example, humans. Colloquially, AI is also often used to describe machines (e.g., computers) that mimic "cognitive" functions associated with the human mind, such as "learning" and "problem solving." For example, AI may be implemented based on a machine learning, a neural network, an artificial neural network (ANN), a convolutional neural network (CNN), a recurrent neural network (RNN), a deep neural network, and/or the like. For example, the ANN is obtained by engineering a cell structure model of a human brain where a process of recognizing a pattern is performed. Therefore, the ANN may include a calculation model that is based on software and/or hardware and is designed to imitate biological calculation abilities by applying many artificial neurons interconnected through connection lines. The human brain consists of neurons that are basic units of a nerve, and encrypts or decrypts information according to different types of dense connections between these neurons. Artificial neurons in the ANN are obtained through simplification of biological neuron functionality. The ANN performs a cognition and/or learning process by interconnecting the artificial neurons having connection intensities. Recently, data processing based on the AI, such as ANN, have been researched.

SUMMARY

At least one example embodiment of the present disclosure provides a method of operating a neural network model capable of protecting the neural network model using a digital rights management (DRM) package.

At least one example embodiment of the present disclosure provides a method of processing data using the method of operating the neural network model.

According to example embodiments, in a method of operating a neural network model, neural network model data and raw data are received during a non-secure mode. The neural network model data is encrypted by digital rights management (DRM). An operation mode is changed from the non-secure mode to a secure mode based on the receiving the neural network model data and the raw data. The neural network model data encrypted by the DRM is decrypted. The neural network model is executed during the secure mode based on decrypted neural network model data. The inference operation is performed on the raw data during the secure mode using the executed neural network model.

According to example embodiments, in a method of processing data, neural network model data and raw data are received during a non-secure mode. The neural network model data is encrypted by digital rights management (DRM). An operation mode is changed from the non-secure mode to a secure mode based on a receiving the neural network model data and the raw data. The neural network model data encrypted by the DRM is decrypted. The neural network model is executed during the secure mode based on the decrypted neural network model data. An inference operation is performed on the raw data during the secure mode using the executed neural network model. The operation mode is changed from the secure mode to the non-secure mode based on a completion of the inference operation. A data processing operation is performed during the non-secure mode based on a result of the inference operation.

According to example embodiments, in a method of operating a neural network model, neural network model including a convolutional neural network (CNN), a first digital rights management (DRM) package and a plurality of frame data are received during a non-secure mode. The first DRM package includes neural network model data and is encrypted by DRM. The plurality of frame data correspond to a plurality of frame images, and are compressed by lossless compression and encrypted by the DRM. An operation mode is changed from the non-secure mode to a secure mode based on the receiving the first DRM package. The neural network model data and the plurality of frame data are decrypted during the secure mode. The decrypted neural network model data and a plurality of the decrypted frame data are provided to a neural processing unit (NPU) during the secure mode. The plurality of decrypted frame data are decompressed by the NPU during the secure mode. An inference operation is performed during the secure mode to on the plurality of frame data using the decrypted neural network model data as parameters of the neural network model and a plurality of the decompressed frame data as input feature map data of the neural network model. The operation mode is changed from the secure mode to the non-secure mode based on a completion of the inference operation. A data processing operation is performed during the non-secure mode based on a result of the inference operation. The (CNN) system performs the inference operation on the plurality of frame data.

In the method of operating the neural network model and the method of processing data according to example embodiments, the neural network model may be executed and the inference operation may be performed using the neural network model data encrypted by the DRM. DRM technology for content protection may be used and the DRM specification may be extended, so the neural network model may be securely and/or safely protected and distributed. In addition, the compression and encryption may be combined and packaged, and thus the neural network model and the contents may be protected without performance degradation and/or deterioration. In some embodiments, the compression and encryption may be simultaneously or concurrently applied and/or performed, and thus the data protection and performance improvement may be achieved at the same time. Accordingly, example embodiments may be used in the development of a new service combining the multimedia streaming and the neural network model such as deep learning.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
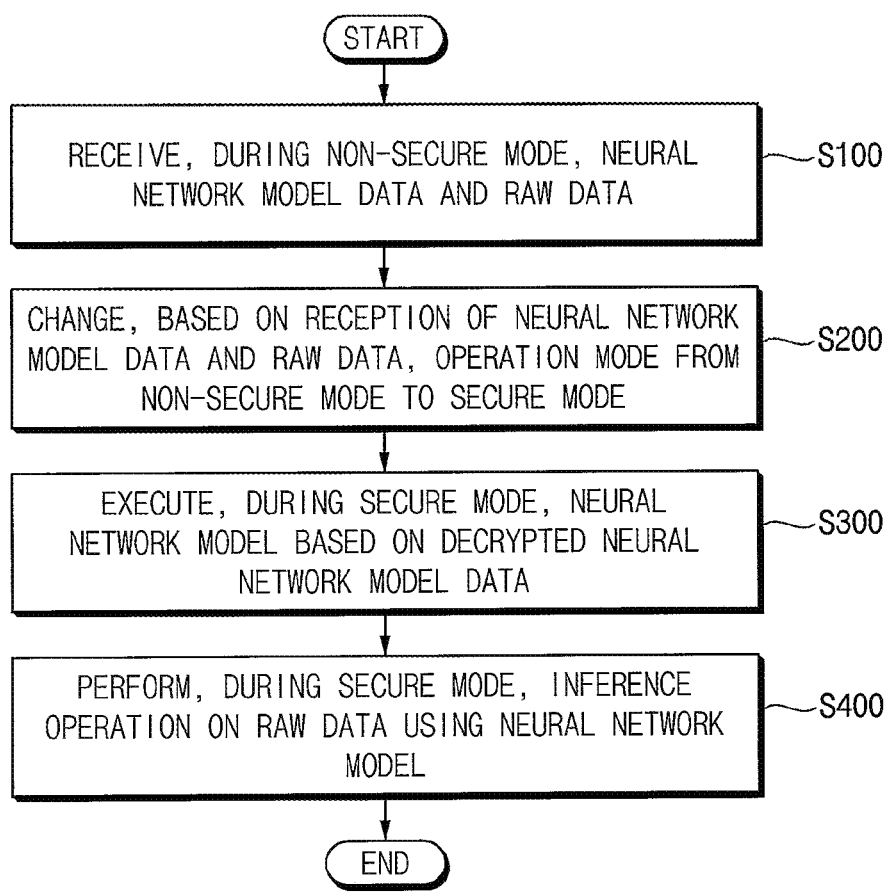
FIG. 1 is a flowchart illustrating a method of operating a neural network model according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

Although the terms "first," "second," etc., may be used herein to describe various elements, components, and/or sections, these elements, components, and/or sections, should not be limited by these terms. These terms are only used to distinguish one element, component, or section, from another element, component, or section. Thus, a first element, component, or section, discussed below may be termed a second element, component, or section, without departing from the scope of this disclosure.

Some example embodiments of the present disclosure may be represented by functional blocks and various processing operations. Some or all of such functional blocks may be implemented as various numbers of hardware and/or software components for performing specific functions. The functional blocks of the present disclosure may be implemented using processing circuitry such as hardware including logic circuits; a hardware/software combination such as a processor executing software; or a combination thereof. For example, the processing circuity more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

FIG. 1 is a flowchart illustrating a method of operating a neural network model according to example embodiments.

Referring to FIG. 1, a method of operating a neural network model according to example embodiments is performed using a digital rights management (DRM) package. In addition, the method of operating the neural network model according to example embodiments may be performed by a system-on-chip (SoC) and/or an electronic system including the system-on-chip. Detailed configurations of the system-on-chip and the electronic system will be described with reference to FIG. 2.

In the method of operating the neural network model according to example embodiments, during a non-secure mode, neural network model (NNM) data and raw data are received (step S100). The non-secure mode may be referred to as a non-trusted execution environment (NTEE), a non-trusted execution mode, and/or a normal mode.

The neural network model data is used to drive and/or operate the neural network model and is encrypted (or packaged) by the DRM. The neural network model data may be data used to perform a computation (or calculation) performed by the neural network model. For example, the neural network model data may include a plurality of parameters (e.g., a plurality of weight data or values) associated with or related to the computation performed by the neural network model. In some embodiments, the neural network model data may, for example, include a plurality of parameters used in an initial set-up of a neural network model and/or updates for an existing neural network model.

In some example embodiments, the neural network model may include at least one of an artificial neural network (ANN) system, a convolutional neural network (CNN) system, a recurrent neural network (RNN) system, and/or a deep neural network (DNN) system. However, the neural network model is not limited thereto, and may, for example include other n-layered neural networks like a deep belief network, restricted Boltzmann machine, a deep learning system, deconvolutional neural networks (DCNN), stacked neural networks (SNN), state-space dynamic neural networks (SSDNN), deep belief networks (DBN), generative adversarial networks (GANs), restricted Boltzmann machines (RBM), and/or the like. Additionally, the neural network model may include other forms of machine learning models, such as, for example, linear and/or logistic regression, statistical clustering, Bayesian classification, decision trees, dimensionality reduction such as principal component analysis, expert systems; and/or combinations thereof, including ensembles such as random forests. A detailed configuration of a neural network system for executing or implementing the neural network model will be described with reference to FIGS. 5A, 5B, and 5C.

The raw data is a target (or input) to an inference operation performed by the neural network model. For example, the raw data may include a plurality of frame data corresponding to a plurality of frame images. For another example, the raw data may include various types of data for the inference operation.

In some example embodiments, as will be described with reference to FIG. 6, the neural network model data and the raw data may be substantially simultaneously provided. For example, the neural network model data and the raw data may be integrated into one DRM package and may be provided at one time (e.g., as part of the same operation and/or at once). In other example embodiments, as will be described with reference to FIG. 10, the neural network model data and the raw data may be sequentially provided. For example, the neural network model data may be provided as a DRM package, and then the raw data may be provided separately from the neural network model data.

Based on a reception of the neural network model data and the raw data, an operation mode is changed, switched, or converted from the non-secure mode to a secure mode (step S200). A configuration for executing the secure mode and an operation of changing the operation mode will be described with reference to FIGS. 3 and 4.

During the secure mode, the neural network model is executed based on decrypted neural network model (step S300). The decrypted neural network model data is obtained by decrypting the neural network model data encrypted by the DRM. During the secure mode, the inference operation is performed on the raw data using the neural network model (step S400). Both steps S300 and S400 may be performed in the secure mode. Steps S300 and S400 will be described with reference to FIGS. 6, 7, 10 and 11.

Though not illustrated, after the inference operation is completed, the electronic system may revert back to the non-secure mode.

Digital rights management (DRM) tools are a set of access control technologies for restricting the use of proprietary hardware and/or protected (e.g., copyrighted and/or trade secret) works. DRM technologies try to control the use, modification, and/or distribution of protected works (such as software and multimedia content), as well as systems within devices that enforce these policies. Common DRM technologies include restrictive licensing agreements. For example, the access to digital materials may be restricted to consumers as a condition of entering a website and/or when downloading software. Encrypting, scrambling of expressive material, and/or embedding a tag (e.g., to control access and reproduction of information, including backup copies for personal use) may be performed. DRM technologies enable content publishers to enforce their own access policies on content, such as restrictions on copying, modifying, and/or viewing. DRM technologies may include verifications (e.g., using product keys), limited install activations, persistent online authentication (and/or the like), encryption, copying restriction, anti-tampering, trackings using watermarks, metadata, and/or the like. Therefore, by using DRM technology on neural network model data and/or raw data, the neural network model data to be used in an inference operation may be provided to a consumer while still reducing the risk of the consumer copying, modification, and/or distribution the neural network model data.

In the method of operating the neural network model, according to example embodiments, the neural network model may be executed and the inference operation may be performed using the neural network model data encrypted by the DRM. The DRM technology defined for content protection may be used and/or the DRM specification may be extended, such that the neural network model may be securely and/or safely protected and/or distributed. In addition, the compression and encryption may be combined and packaged, and thus the neural network model and the contents may be protected without performance degradation and/or deterioration. For example, the compression and encryption may be simultaneously or concurrently applied and/or performed, and thus the data protection and performance improvement may be achieved at the same time. Accordingly, example embodiments may be used in the development of a new service combining the multimedia streaming and the neural network model.

Figure 2:
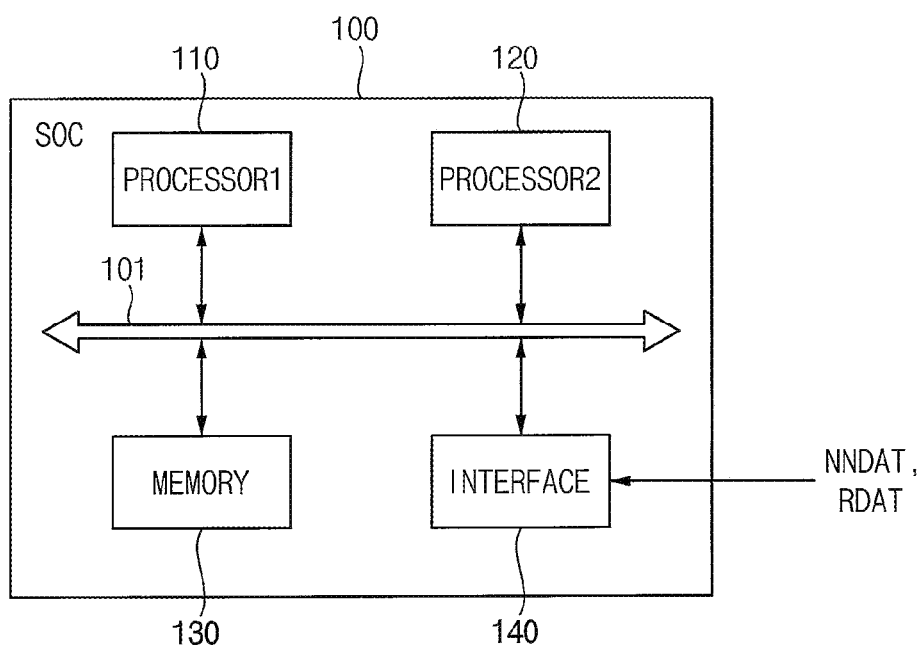
FIG. 2 is a block diagram illustrating a system-on-chip according to example embodiments.

FIG. 2 is a block diagram illustrating a system-on-chip according to example embodiments.

Referring to FIG. 2, a system-on-chip 100 includes a first processor 110, a second processor 120, a memory 130, and an interface 140. The system-on-chip 100 may further include a bus 101. For convenience of illustration, some elements of the system-on-chip 100 and an electronic system including the system-on-chip 100 are not illustrated in FIG. 2, and will be described in detail with reference to FIG. 3.

In some example embodiments, for example when the electronic system including the system-on-chip 100 is a mobile system, the system-on-chip 100 may be an application processor (AP), or the like.

The first processor 110 controls overall operations of the system-on-chip 100. For example, when the electronic system including the system-on-chip 100 is the mobile system, the first processor 110 may perform various computational functions such as particular calculations and tasks, may execute an operating system (OS) to drive the mobile system, and may execute various applications for providing an internet browser, a game, a video, a camera, or the like. For example, the first processor 110 may include a central processing unit (CPU), a microprocessor, or the like.

The second processor 120 executes and/or drives a neural network model, and controls operations of the neural network model. For example, the second processor 120 may include a neural processing unit (NPU).

In some example embodiments, as will be described with reference to FIG. 4, each of the first and second processors 110 and 120 may be driven based on a secure operating system and a normal operating system (or a non-secure operating system). The system-on-chip 100 and the electronic system including the system-on-chip 100 may operate in a secure mode based on the secure operating system and may operate in a non-secure mode (or a normal mode) based on the normal operating system.

In some example embodiments, each of the first and second processors 110 and 120 may include a single processor core and/or a plurality of processor cores. For example, each of the first and second processors 110 and 120 may be implemented with a multi-core, such as a dual-core, a quad-core, a hexa-core, or the like. In some example embodiments, each of the first and second processors 110 and 120 may further include a cache memory that is located inside or outside each of the first and second processors 110 and 120.

The memory 130 stores data and/or instructions that are processed and/or executed by the first and second processors 110 and 120. For example, when the electronic system including the system-on-chip 100 is the mobile system, the memory 130 may store a boot image for booting the mobile system, a file system for the operating system to drive the mobile system, a device driver for an external device connected to the mobile system, and/or an application executed on the mobile system. For example, the memory 130 may include at least one of a volatile memory and/or a nonvolatile memory. For example, the memory 130 may include tangible and/or non-transitory computer-readable storage media, such as random access memory (RAM), read only memory (ROM), a permanent mass storage device (such as, solid state (e.g., NAND flash) device, etc.), and/or any other like data storage mechanism capable of storing and recording data.

The interface 140 communicates with an external device. For example, the interface 140 may communicate with the external device based on a wireless communication such as a wireless fidelity (WiFi) communication, a 3G communication, a 4G communication, a long term evolution (LTE) communication, a 5G communication, or the like. For another example, the interface 140 may communicate with the external device based on a predetermined (or otherwise desirable) communication standard, such as a mobile industry processor interface (MIPI), or the like. In some embodiments the interface 140 may communicate with other processors, chips, and/or devices not included on the system-on-chip 100, but otherwise attached to and/or included in the mobile system.

The system-on-chip 100, according to example embodiments, may perform the method of operating the neural network model according to example embodiments. For example, the interface 140 may receive neural network model data NNDAT and raw data RDAT from the external device. The memory 130 may store instructions executed by the first and second processors 110 and 120 to change an operation mode from the non-secure mode to a secure mode based on a reception of the neural network model data NNDAT and the raw data RDAT; to execute, during the secure mode, the neural network model based on decrypted neural network model data that is obtained by decrypting the neural network model data NNDAT encrypted or packaged by the DRM; and to perform, during the secure mode, the inference operation on the raw data RDAT using the neural network model. The first and second processors 110 and 120 may be connected to the memory 130 and the interface 140 via the bus 101, and may control an execution of the instructions. For example, the second processor 120 may control the operation of the neural network model.

Figure 3:
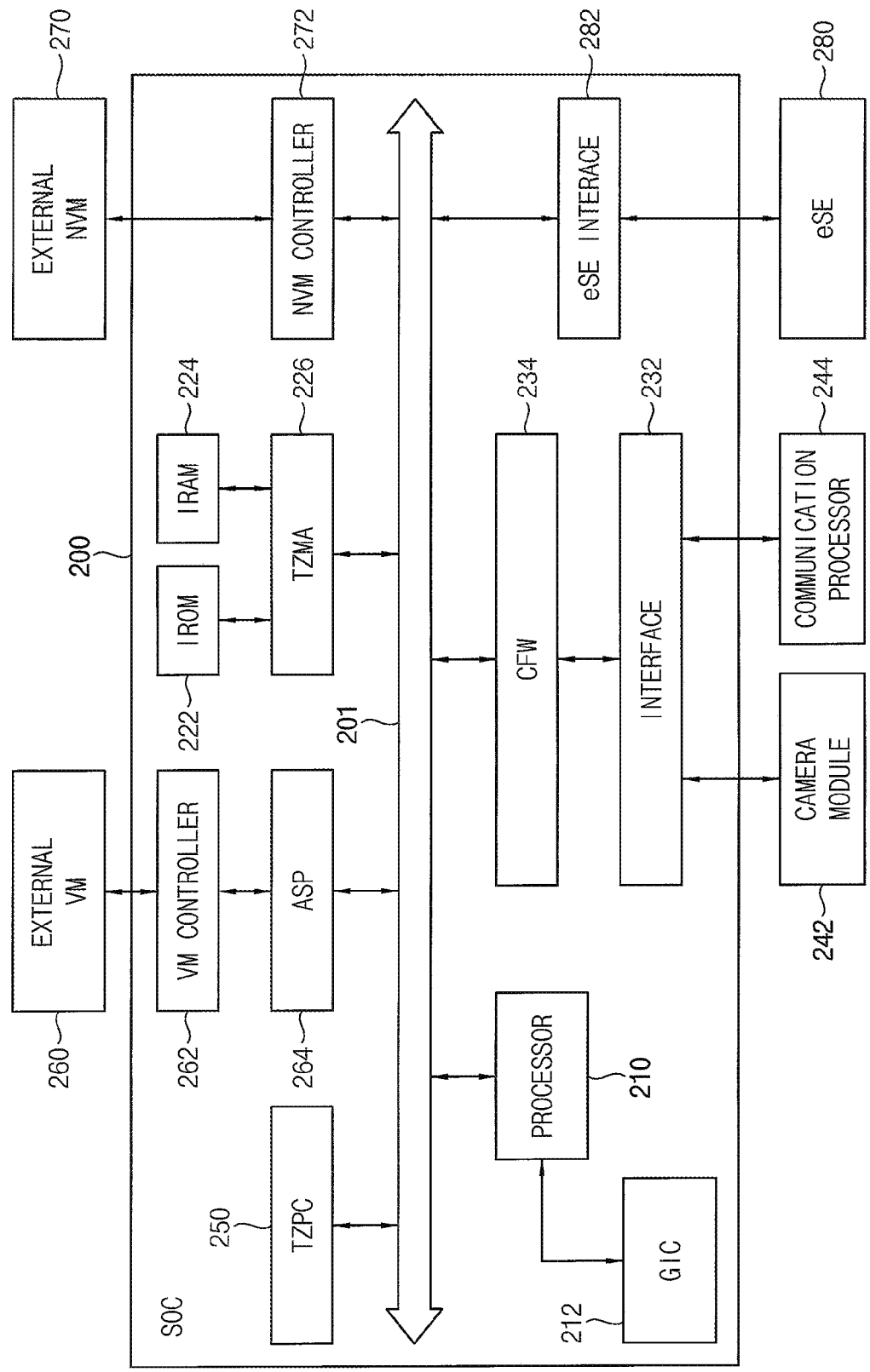
FIG. 3 is a block diagram illustrating an electronic system including a system-on-chip according to example embodiments.

FIG. 3 is a block diagram illustrating an electronic system including a system-on-chip according to example embodiments.

Referring to FIG. 3, an electronic system may include a system-on-chip 200, a camera module 242, a communication processor 244, a volatile memory 260, a nonvolatile memory 270, and an embedded secure element (eSE) 280. FIG. 3 illustrates an example where the electronic system is implemented as a mobile system, but the electronic system is not limited thereto.

The system-on-chip 200 may control overall operations of the mobile system. The system-on-chip 200 may include a processor 210, an interrupt controller (e.g., a generic interrupt controller (GIC)) 212, a protection controller (e.g., a TrustZone protection controller (TZPC)) 250, a first internal memory (IROM) 222, a second internal memory (IRAM) 224, a memory adapter (e.g., a TrustZone memory adapter (TZMA)) 226, a first interface 232, a contents firewall (CFW) 234, a first memory controller 262, an address space protector (ASP) 264, a second memory controller 272, a second interface (e.g., an eSE interface) 282 and a bus 201.

The processor 210 may correspond to the first and second processors 110 and 120 in FIG. 2. Although FIG. 3 illustrates one processor 210 for convenience of illustration, the system-on-chip 200 may include one, two, and/or more processors according to some example embodiments. The processor 210 may be connected to other elements (e.g., hardwares) via the bus 201. For example, the processor 210 may include an ARM processor core, and the bus 201 may include an AMBA (advanced microcontroller bus architecture, and/or ARM main memory bus architecture) bus.

The interrupt controller 212 may set secure properties of all of interrupt resources in the system-on-chip 200. For example, the interrupt controller 212 may divide interrupts into secure interrupts and normal interrupts. The secure interrupts may be referred to as trusted interrupts and/or fast interrupt requests (FIQ). The normal interrupts may be referred to as non-secure interrupts, non-trusted interrupts, and/or interrupt requests (IRQ). In some embodiments, such secure properties of the interrupt resources may only be set in the secure mode. The secure interrupts may be processed in the secure mode, and the normal interrupts may be processed in the non-secure mode.

The protection controller 250 may set secure properties of all of hardware resources (e.g., all elements) in the system-on-chip 200. In some embodiments, the protection controller 250 may divide hardwares (e.g., elements) into first hardwares for the secure mode and second hardwares for the non-secure mode. For example, such secure properties of the hardware resources may only be set in the secure mode and may not be set in the non-secure mode. In some embodiments, for example, the interrupt controller 212 may include a chip select and/or slave select control line. The first hardwares may operate in the secure mode, and the second hardwares may operate in the non-secure mode. In some example embodiments, hardware may be included in both the first and second hardwares. In this case, the hardware included in both the first and second hardwares may operate in both the secure and non-secure modes.

The first internal memory 222 and the second internal memory 224 may correspond to the memory 130 in FIG. 2. For example, the first internal memory 222 may include at least one nonvolatile memory, and the second internal memory 224 may include at least one volatile memory.

The memory adapter 226 may be interoperable with the protection controller 250, and may divide a storage region in the second internal memory 224 into a secure region and a non-secure region. In some embodiments, such division of the storage region may only be performed in the secure mode.

The first interface 232 may correspond to the interface 140 in FIG. 2. For example, in some embodiments, the first interface 232 may connect the system-on-chip 200 with the camera module 242 outside the system-on-chip 200 such that the system-on-chip 200 communicates with the camera module 242 based on a MIPI communication. In some embodiments, the first interface 232 may connect the system-on-chip 200 with the communication processor 244 outside the system-on-chip 200 such that the system-on-chip 200 communicates with the communication processor 244 based on, for example, a wireless communication.

The contents firewall 234 may control accesses to the hardwares in the system-on-chip 200, and may prevent leakage of information. For example, the contents firewall 234 may control an accessible address space of the first interface 232, and may control an access from the camera module 242 and/or the communication processor 244 when the system-on-chip 200 exchanges data with the camera module 242 and/or the communication processor 244.

The first memory controller 262 may control the volatile memory 260 outside the system-on-chip 200. For example, first memory controller 262 may control access to and/or from the volatile memory 260, and/or may transmit read and/or write operations to the volatile memory 260. The volatile memory 260 may include at least one volatile memory, such as a dynamic random access memory (DRAM), a synchronous DRAM (SDRAM), a static random access memory (SRAM), and/or the like.

The address space protector 264 may divide a storage region in the volatile memory 260 into a secure region and a non-secure region, and may control access to the volatile memory 260.

The second memory controller 272 may control the nonvolatile memory 270 outside the system-on-chip 200. For example, the second memory controller 272 may control access to and/or from the nonvolatile memory 270, and/or may transmit read and/or write operations to the nonvolatile memory 270. The nonvolatile memory 270 may include at least one nonvolatile memory, such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), and/or the like. In some embodiments, the nonvolatile memory 270 may be implemented with an embedded multimedia card (eMMC), a universal flash storage (UFS), or the like.

The second interface 282 may connect the system-on-chip 200 with the embedded secure element 280 such that the system-on-chip 200 exchanges data with the embedded secure element 280. In the secure mode, the system-on-chip 200 may execute various secure applications (e.g., for financial transactions, mobile shopping, and/or the like) based on the embedded secure element 280.

The system-on-chip 200 may control the execution and driving of the neural network model in the secure mode according to example embodiments, and detailed operations will be described with reference to FIGS. 4 and 6 through 12.

Although the MIPI communication, the wireless communication, and the eSE communication are described as examples of interfaces supported by the system-on-chip 200 in FIG. 3, interfaces supported by the system-on-chip 200 are not limited thereto. For example, the system-on-chip 200 may include at least one of various elements for performing communications according to one of various types of protocols such as a universal serial bus (USB), an Ethernet, a near field communication (NFC), a radio frequency identification (RFID), Global System of Mobile Communications (GSM), General Packet Radio Service (GPRS), Wideband Code Division Multiple Access (WCDMA), High Speed Packet Access (HSxPA), etc.

Figure 4:
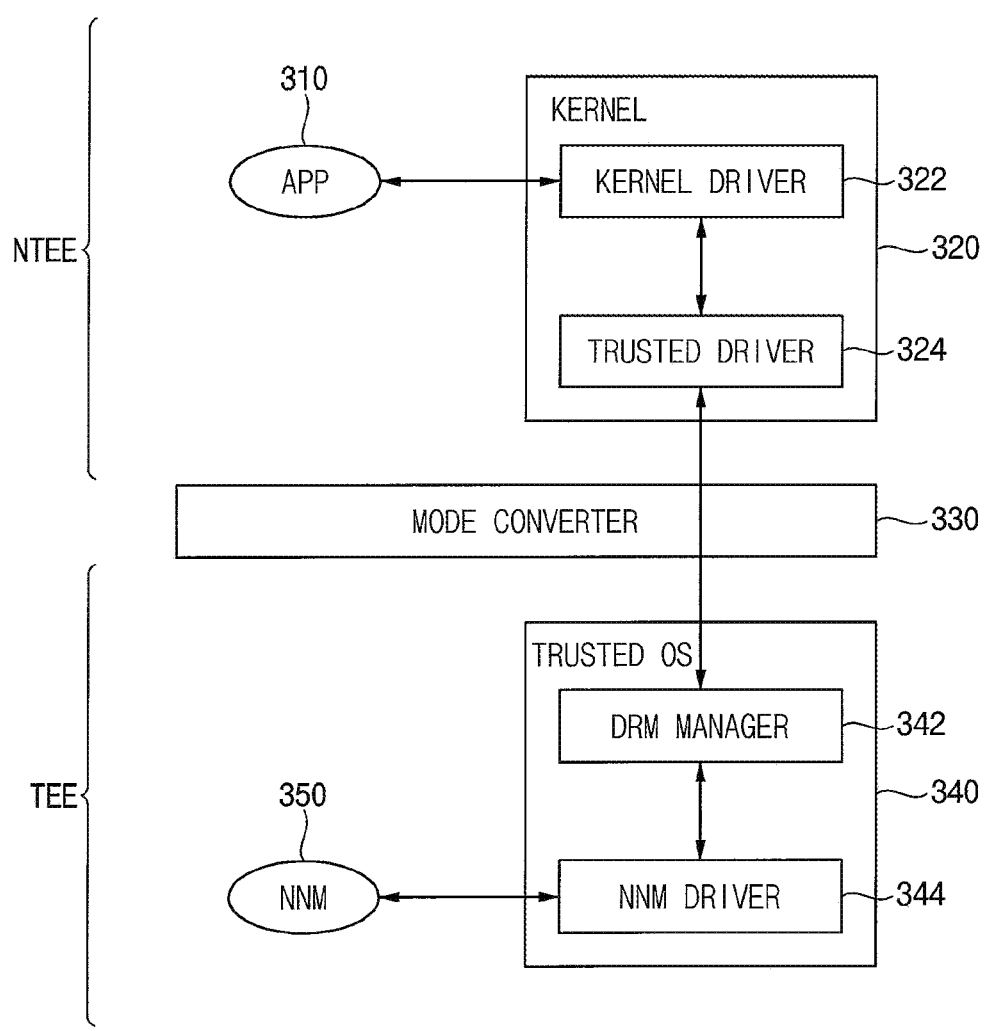
FIG. 4 is a diagram for describing a method of operating a neural network model according to example embodiments.

FIG. 4 is a diagram for describing a method of operating a neural network model according to example embodiments.

Referring to FIG. 4, an example of software configuration in a mobile system for executing and/or driving the neural network model in the secure mode is illustrated when the electronic system, according to example embodiments, is the mobile system.

For example, the mobile system may operate in the non-secure mode and the secure mode. The non-secure mode may be referred to as a non-trusted execution environment (NTEE), and the secure mode may be referred to as a trusted execution environment (TEE).

Hereinafter, an operation of the mobile system will be described based on the example of the software configuration illustrated in FIG. 4.

A first processor (e.g., the first processor 110 in FIG. 2) included in the mobile system may execute a kernel 320 corresponding to a normal operating system, and then the mobile system may operate in the non-trusted execution environment. The kernel 320 may be referred to as a non-secure operating system and/or a rich operating system.

In the non-trusted execution environment of the mobile system, an application (APP) 310 may be executed. The application 310 may be, for example, for providing an internet browser, a game, a video, a camera, or the like.

When an execution of a neural network model 350 is requested by the application 310 (e.g., when neural network model data (e.g., the neural network model data NNDAT in FIG. 2) and raw data (e.g., the raw data RDAT in FIG. 2) are received in the non-trusted execution environment) a driver 322 in the kernel 320 may be called. For example, the driver 322 may be a kernel driver for processing the neural network model data.

To process the neural network model data and/or the raw data, the operation mode of the mobile system may be changed by a trusted driver 324 and a mode converter 330. For example, the first processor in the mobile system may execute a trusted operating system 340, and then the mobile system may operate in the trusted execution environment. For example, the trusted driver 324 may be a kernel driver for changing the operation mode, and the mode converter 330 may be a firmware for changing the operation mode.

A DRM manager 342 in the trusted operating system 340 may process the neural network model data. For example, a DRM package including the neural network model data may be received, and the neural network model data that is included in the DRM package and is encrypted by the DRM may be decrypted by the DRM manager 342. When the raw data is also included in the DRM package, the raw data that is included in the DRM package and is encrypted by the DRM may also be decrypted.

When the processing of the neural network model data and/or the raw data is completed, a driver 344 in the trusted operating system 340 may be called, and the neural network model 350 may be executed. For example, a second processor (e.g., the second processor 120 in FIG. 2) included in the mobile system may execute the neural network model 350 based on decrypted neural network model data, and may perform an inference operation on the received (and/or decrypted) raw data raw data. For example, the driver 344 may be a driver for executing the neural network model 350. In some embodiments, the neural network model 350 may be configured perform an inference operation on the encrypted raw data.

When the processing of the neural network model data and/or the raw data is not completed, e.g., when the decryption fails because the decryption is performed by an unauthenticated or unverified user, the driver 344 may not be called, and the neural network model 350 may not be executed.

In addition, after the neural network model 350 is executed and the computation is completed, the mobile system may change the operation mode from the secure mode to the non-secure mode by the mode converter 330.

In some example embodiments, the operations in the secure mode described with reference to FIGS. 2 through 4 may be executed and implemented based on peripheral and/or memory isolation technology, such as the TrustZone technology.

Figure 5A:
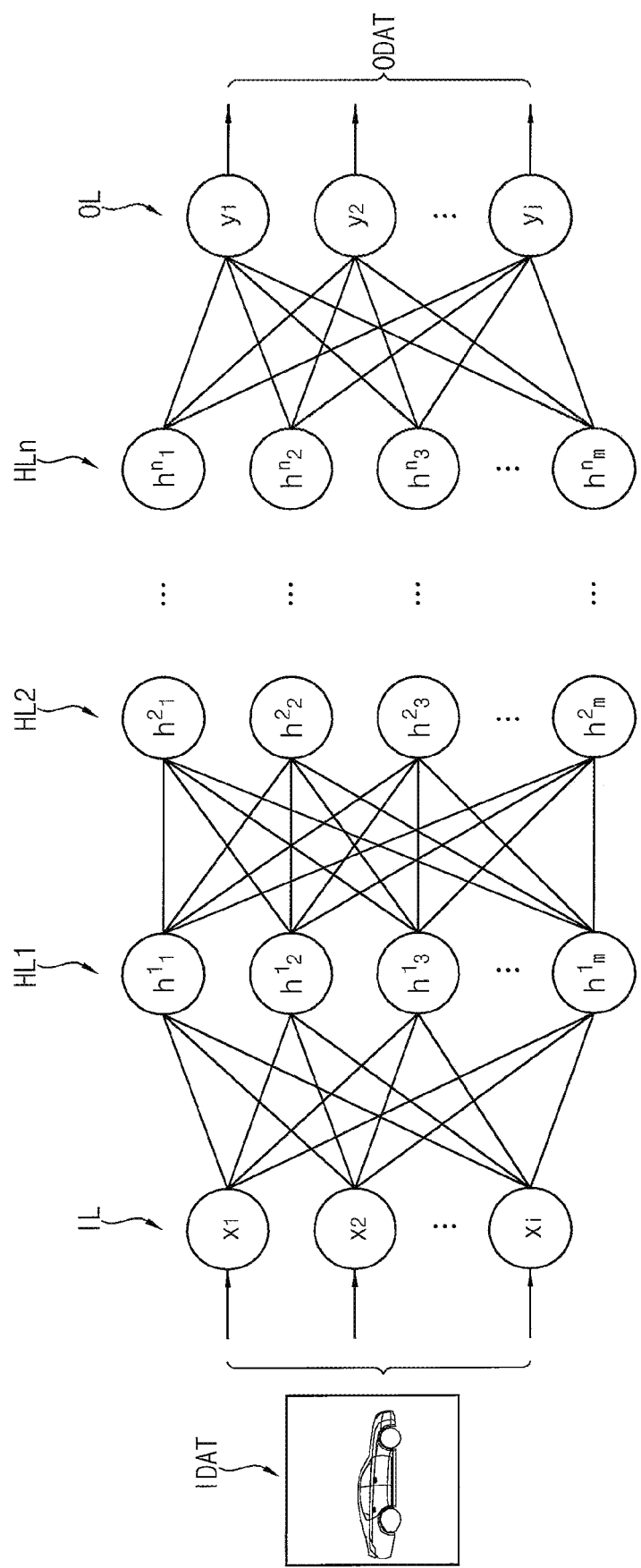
FIGS. 5A, 5B, and 5C are diagrams for describing examples of network structures of neural network models that are driven according to example embodiments.
Figure 5B:
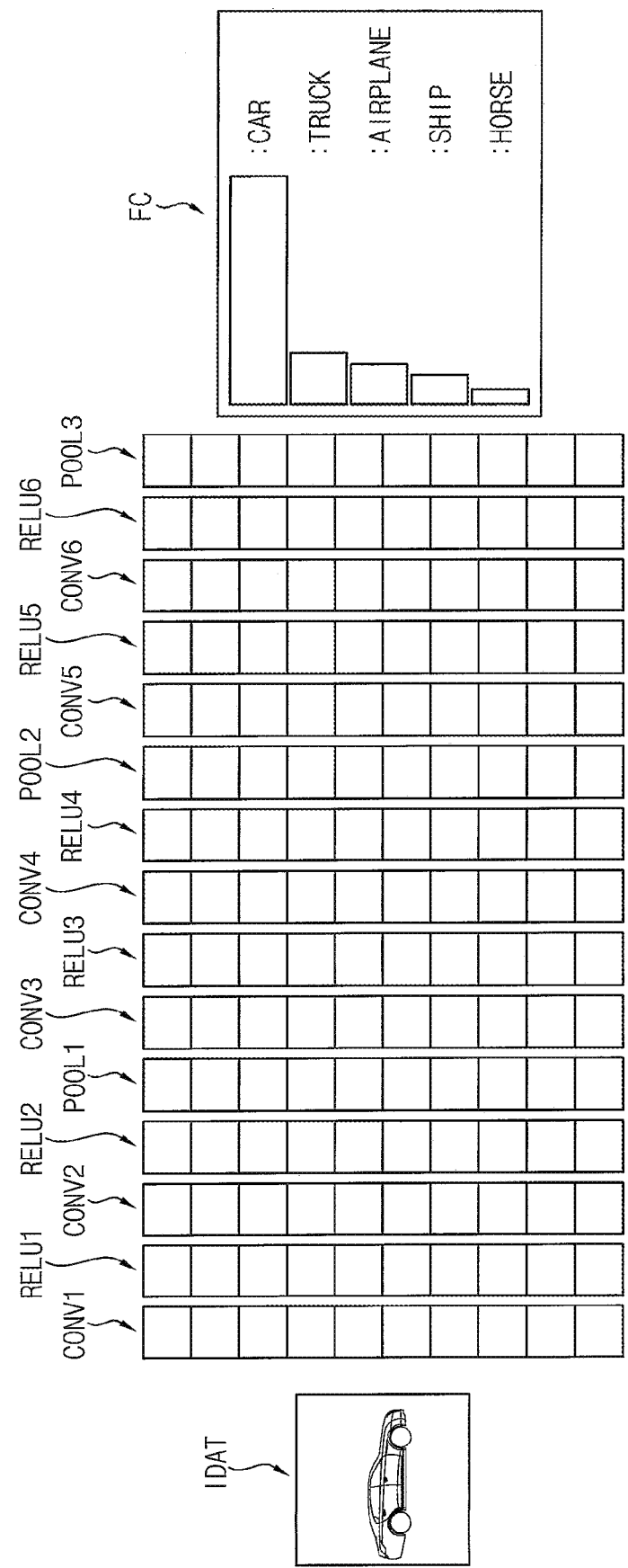
Figure 5C:
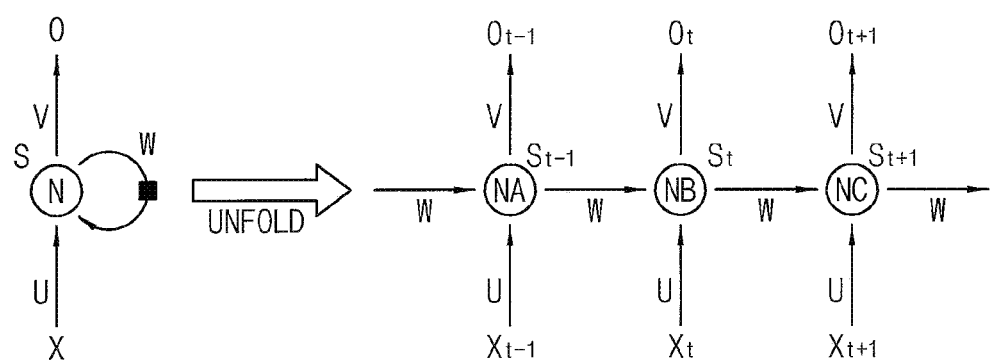

FIGS. 5A, 5B, and 5C are diagrams for describing examples of network structures of neural network models that are driven according to example embodiments.

Referring to FIG. 5A, a general neural network (e.g., an ANN) may include an input layer IL, a plurality of hidden layers HL1, HL2, . . . , HLn and an output layer OL.

The input layer IL may include i input nodes $x_1, x_2, \ldots, x_i$, where i is a natural number. Input data (e.g., vector input data) IDAT whose length is i may be input to the input nodes $x_1, x_2, \ldots, x_i$ such that each element of the input data IDAT is input to a respective one of the input nodes $x_1, x_2, \ldots, x_i$.

The plurality of hidden layers HL1, HL2, . . . , HLn may include n hidden layers, where n is a natural number, and may include a plurality of hidden nodes $h^1_1, h^1_2, h^1_3, \ldots, h^1_m, h^2_1, h^2_2, h^2_3, \ldots, h^2_m, h''_1, h''_2, h''_3, \ldots, h''_m$. For example, the hidden layer HL1 may include m hidden nodes $h^1_1, h^1_2, h^1_3, \ldots, h^1_m$, the hidden layer HL2 may include m hidden nodes $h^2_1, h^2_2, h^2_3, \ldots, h^2_m$, and the hidden layer HLn may include m hidden nodes $h''_1, h''_2, h''_3, \ldots, h''_m$, where m is a natural number.

The output layer OL may include j output nodes $y_1, y_2, \ldots, y_j$, where j is a natural number. Each of the output nodes $y_1, y_2, \ldots, y_j$ may correspond to a respective one of classes to be categorized. The output layer OL may output output values (e.g., class scores and/or simply scores) associated with the input data IDAT for each of the classes. The output layer OL may be referred to as a fully-connected layer and may indicate, for example, a probability that the input data IDAT corresponds to a category (e.g., a probability that an object is a car and/or that an effect has occurred based on the inference of the neural network model).

A structure of the neural network illustrated in FIG. 5A may be represented by information on branches (and/or connections) between nodes illustrated as lines, and a weighted value assigned to each branch, which is not illustrated. In some embodiments, nodes within one layer may not be connected to one another, but nodes of different layers may be fully and/or partially connected to one another.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 5A may not be suitable for handling input image data (or input sound data) because each node (e.g., the node $h^1_1$) is connected to all nodes of a previous layer (e.g., the nodes $x_1, x_2, \ldots, x_i$ included in the layer IL) and then the number of weighted values drastically increases as the size of the input image data increases. Thus, a CNN, which is implemented by combining the filtering technique with the general neural network, has been researched such that two-dimensional image (e.g., the input image data) is efficiently trained by the CNN.

Referring to FIG. 5B, a CNN may include a plurality of layers CONV1, RELU1, CONV2, RELU2, POOL1, CONV3, RELU3, CONV4, RELU4, POOL2, CONV5, RELU5, CONV6, RELU6, POOLS, and FC.

Unlike the general neural network, each layer of the CNN may have three dimensions of width, height, and depth, and thus data that is input to each layer may be and/or include volume data having three dimensions (e.g., width, height, and depth). For example, if an input image in FIG. 5B has a size of 32 widths (e.g., 32 pixels) and 32 heights and three color channels R, G and B, input data IDAT corresponding to the input image may have a size of 32*32*3. The input data IDAT in FIG. 5B may be referred to as input volume data and/or input activation volume.

Each of the convolutional layers CONV1, CONV2, CONV3, CONV4, CONV5, and CONV6 may perform a convolutional operation on input volume data. For example, in an image processing, the convolutional operation represents an operation in which image data is processed based on a mask with weighted values and an output value is obtained by multiplying input values by the weighted values and adding up the total multiplied values. The mask may be referred to as a filter and/or window.

Parameters of each convolutional layer may include of a (and/or a set of) learnable filter(s). Every filter may be small spatially (along width and height), but may extend through the full depth of an input volume. For example, during the forward pass, each filter may be slid (e.g., "convolved") across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of the rectified linear unit (RELU) layers RELU1, RELU2, RELU3, RELU4, RELU5, and RELU6 may perform a RELU operation that corresponds to an activation function defined by, for example, a function $f(x)=\max(0, x)$ (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2, and POOLS may perform a down-sampling operation on input volume data along spatial dimensions of width and height. For example, input values (e.g., four) arranged in a matrix formation (e.g., 2*2) may be converted into one output value based on a filter (e.g., 2*2). For example, in some embodiments, a maximum value (e.g., four input values arranged in a 2*2 matrix formation) may be selected based on maximum pooling (e.g., 2*2), or an average value of input values (e.g., four) arranged in a matrix formation (e.g., 2*2) may be obtained based on average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the CNN, pairs of the CONV/RELU layers may be repeatedly arranged in the CNN, and the pooling layer may be periodically inserted in the CNN, thereby reducing a spatial size of image and extracting a characteristic of image.

An output layer or a fully-connected layer FC may output results (e.g., class scores) of the input volume data IDAT for each of the classes. For example, the input volume data IDAT corresponding to the two-dimensional image may be converted into a one-dimensional matrix and/or vector as the convolutional operation and the down-sampling operation are repeated. For example, the fully-connected layer FC may represent probabilities that the input volume data IDAT corresponds to a classification (e.g., a car, a truck, an airplane, a ship and/or a horse).

The types and number of layers included in the CNN may not be limited to an example described with reference to FIG. 5B and may be changed according to example embodiments. In addition, although not illustrated in FIG. 5B, the CNN may further include other layers such as a softmax layer for converting score values corresponding to predicted results into probability values, a bias adding layer for adding at least one bias, or the like.

Referring to FIG. 5C, a RNN may include a repeating structure using a specific node and/or cell N illustrated on the left side of FIG. 5C.

A structure illustrated on the right side of FIG. 5C may represent that a recurrent connection of the RNN illustrated on the left side is unfolded (and/or unrolled). The term "unfolded" (or unrolled) means that the network is written out or illustrated for the complete or entire sequence including all nodes NA, NB, and NC. For example, if the sequence of interest is a sentence of 3 words, the RNN may be unfolded into a 3-layer neural network, one layer for each word (e.g., without recurrent connections or without cycles).

In the RNN in FIG. 5C, X represents an input of the RNN. For example, $X_t$ may be an input at time step t, and $X_{t-1}$ and $X_{t+1}$ may be inputs at time steps t−1 and t+1, respectively.

In the RNN in FIG. 5C, S represents a hidden state. For example, $S_t$ may be a hidden state at the time step t, and $S_{t-1}$ and $S_{t+1}$ may be hidden states at the time steps t−1 and t+1, respectively. The hidden state may be calculated based on a previous hidden state and an input at a current step. For example, $S_t = f(UX_t + WS_{t-1})$. For example, the function f may be usually a nonlinearity function such as tanh or RELU. $S_{-1}$, which may be used to calculate a first hidden state, may be typically initialized to all zeroes.

In the RNN in FIG. 5C, O represents an output of the RNN. For example, $O_t$ may be an output at the time step t, and $O_{t-1}$ and $O_{t+1}$ may be outputs at the time steps t−1 and t+1, respectively. For example, if the RNN is configured to predict a next word in a sentence, $O_t$ would represent a vector of probabilities across a vocabulary. For example, $O_t = \text{softmax}(VS_t)$.

In the RNN in FIG. 5C, the hidden state S may be a "memory" of the network. For example, the "memory" of the RNN may have captured information about and/or based on what has been calculated so far. In some embodiments, the hidden state S does not include a record of what has been calculated, but may, for example, be a result of some and/or all the calculations in the previous steps. The hidden state $S_t$ may capture information about what happened in all the previous time steps. The training of the RNN may, therefore, be based on the "memory" of the network. The output $O_t$ may be calculated solely based on the training at the current time step t. In addition, unlike a traditional neural network, which uses different parameters at each layer, the RNN may share the same parameters (e.g., U, V, and W in FIG. 5C) across all time steps. This may represent the fact that the same task may be performed at each step, just with different inputs. This may greatly reduce the total number of parameters required to be trained or learned.

In some example embodiments, at least one of various services and/or applications (e.g., an image classify service, a user authentication service based on bio-information and/or biometric data, an advanced driver assistance system (ADAS) service, a voice assistant service, an automatic speech recognition (ASR) service, and/or the like) may be performed, executed, or processed by the neural network system described with reference to FIGS. 5A, 5B and 5C.

Hereinafter, processes associated with the execution and operation of the neural network model and/or the neural network system according to example embodiments will be described in detail with reference to FIGS. 6 through 12.

Figure 6:
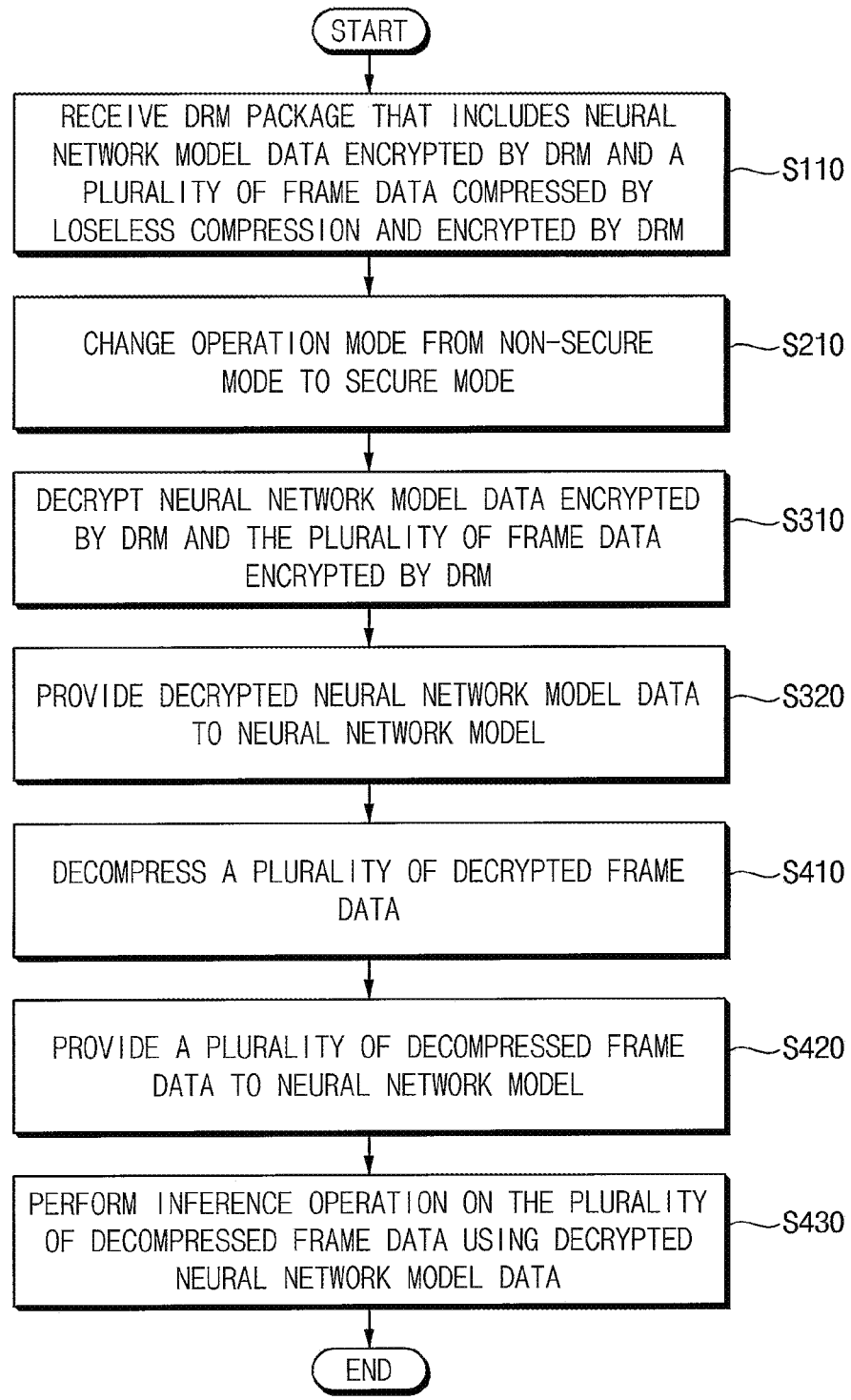
FIG. 6 is a flowchart illustrating an example of a method of operating a neural network model of FIG. 1.

FIG. 6 is a flowchart illustrating an example of a method of operating a neural network model of FIG. 1.

Referring to FIG. 6, an example where the neural network model data and the raw data are substantially simultaneously provided from an external device is illustrated.

For example, as with the neural network model data, the raw data may be encrypted (or packaged) by the DRM. The neural network model data encrypted by the DRM and the raw data encrypted by the DRM may be integrated with each other, and may be provided as one DRM package.

In addition, the raw data may include a plurality of frame data corresponding to a plurality of frame images. For example, the plurality of frame data may be compressed by lossless compression.

As in step S100 of FIG. 1, the DRM package may be received (step S110). The DRM package may include the neural network model data encrypted by the DRM and the plurality of frame data compressed by the lossless compression and encrypted by the DRM. Step S110 may be performed during the non-secure mode.

As in step S200 of FIG. 1, the operation mode may be changed from the non-secure mode to the secure mode based on a reception of the DRM package (step S210).

As in step S300 of FIG. 1, the neural network model may be executed during the secure mode based on the reception of the DRM package. For example, the execution of the neural network model may include decrypting the neural network model data that is included in the DRM package and encrypted by the DRM and the plurality of frame data that are included in the DRM package, compressed by the lossless compression and encrypted by the DRM (step S310); and providing the decrypted neural network model data to the neural network model (step S320). Steps S310 and S320 may be performed during the secure mode.

As in step S400 of FIG. 1, an inference operation may be performed using the received raw data. For example, a plurality of decrypted frame data may be decompressed (step S410); and a plurality of decompressed frame data may be provided to the neural network model (step S420). The inference operation may be performed on the plurality of decompressed frame data using the decrypted neural network model data (step S430). Steps S410, S420 and S430 may be performed during the secure mode. Though not illustrated, after the inference operation is completed, the electronic system may revert back to the non-secure mode.

Figure 7:
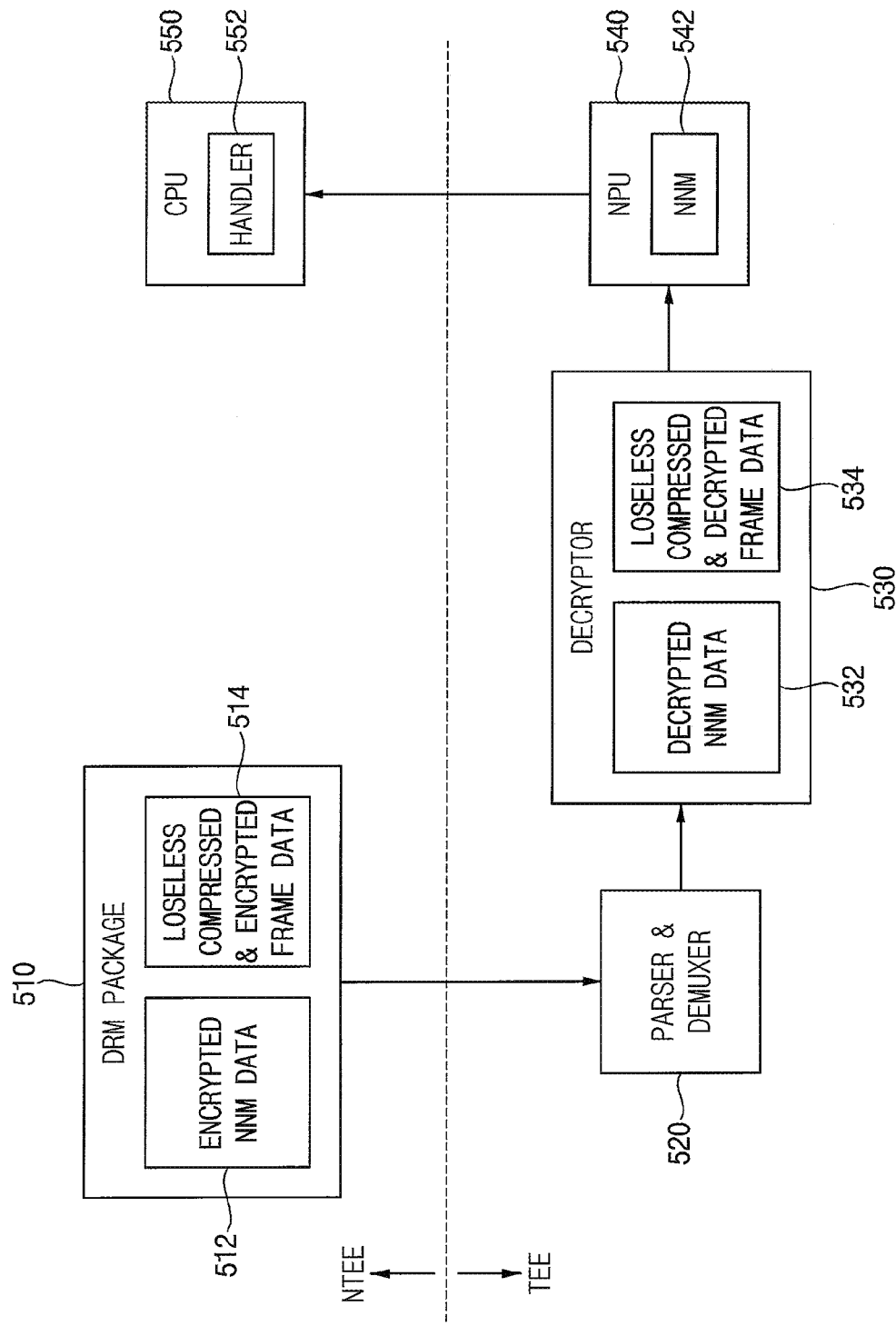
FIG. 7 is a diagram for describing a method of operating a neural network model of FIG. 6.

FIG. 7 is a diagram for describing a method of operating a neural network model of FIG. 6.

Referring to FIG. 7, a DRM package 510 may be received during the non-secure mode (e.g., in the non-trusted execution environment). The DRM package 510 may include encrypted neural network model data 512 and a plurality of lossless-compressed and encrypted frame data 514. For example, the neural network model and the plurality of frame data that are targets to the inference operation by the neural network model may be encrypted and packaged using the DRM specification (e.g., using MPEG-CENC). The DRM package 510 may be referred to as a DRM container.

The plurality of frame data may be losslessly compressed and encrypted at the same time. For example, the lossless compression may be performed based on arithmetic coding such as context-adaptive binary arithmetic coding (CABAC), variable length coding such as context-adaptive variable-length coding (CAVLC), and/or the like. For example, the encryption may be performed based on an advanced encryption standard (AES) (e.g., AES-128).

The neural network model data may be encrypted in the same manner as the plurality of frame data.

Based on a reception of the DRM package 510, the operation mode may be changed from the non-secure mode (e.g., the NTEE) to the secure mode (e.g., the TEE).

During the secure mode, e.g., in the TEE, the DRM package 510 may be provided to a parser and demuxer 520. The parser and demuxer 520 may divide the DRM package 510 into the encrypted neural network model data 512 and the plurality of lossless-compressed and encrypted frame data 514, and may divide the plurality of lossless-compressed and encrypted frame data 514 by units of frames.

A decryptor 530 may obtain decrypted neural network model data 532 by decrypting the encrypted neural network model data 512. For example, in the TEE, a license suitable (or otherwise appropriate) for a license acquisition sequence may be obtained, and the encrypted neural network model data 512 may be decrypted using the license. The decrypted neural network model data 532 may be provided to an NPU 540, and may be used for the computation performed by a neural network model 542.

In addition, the decryptor 530 may obtain a plurality of lossless-compressed and decrypted frame data 534 by decrypting the plurality of lossless-compressed and encrypted frame data 514. The neural network model data and the plurality of frame data may be encrypted in the same manner, and thus the neural network model data and the plurality of frame data may be decrypted in the same manner. The plurality of lossless-compressed and decrypted frame data 534 may be provided to the NPU 540, and may be used as input feature map (IFM) data of the neural network model 542.

The NPU 540 may execute and/or drive the neural network model 542 based on the decrypted neural network model data 532 and a plurality of lossless-compressed and decrypted frame data 534. For example, the NPU 540 may decompress the plurality of lossless-compressed and decrypted frame data 534, may perform the inference operation by using or providing a plurality of decompressed frame data as an input of the neural network model 542 and by using or providing the decrypted neural network model data 532 as a parameter of the neural network model 542, and may output the result of the inference operation.

After that, based on a completion of the inference operation, the operation mode may be changed from the secure mode (e.g., the trusted execution environment) to the non-secure mode (e.g., the non-trusted execution environment).

During the non-secure mode (e.g., in the non-trusted execution environment) the result of the inference operation may be provided or triggered to a CPU 550 and a handler 552 included in the CPU 550. The CPU 550 and the handler 552 may perform the data processing operation based on the result of the inference operation. For example, the data processing operation may include various functions, calculations, and/or tasks for providing an image classify service, a user authentication service, an ADAS service, a voice assistant service, an ASR service, and/or the like, using the result of the inference operation.

In some example embodiments, the CPU 550 and the NPU 540 may correspond to the first processor 110 and the second processor 120 in FIG. 2, respectively.

In some example embodiments, at least a part of the parser and demuxer 520 and the decryptor 530 may be implemented as hardware. For example, at least a part of the parser and demuxer 520 and the decryptor 530 may be included in a computer-based electronic system. In other example embodiments, at least a part of the parser and demuxer 520 and the decryptor 530 may be implemented as instruction codes or program routines (e.g., a software program). For example, the instruction codes and/or the program routines may be executed by a computer-based electronic system, and may be stored in any storage device located inside or outside the computer-based electronic system.

Figure 8:
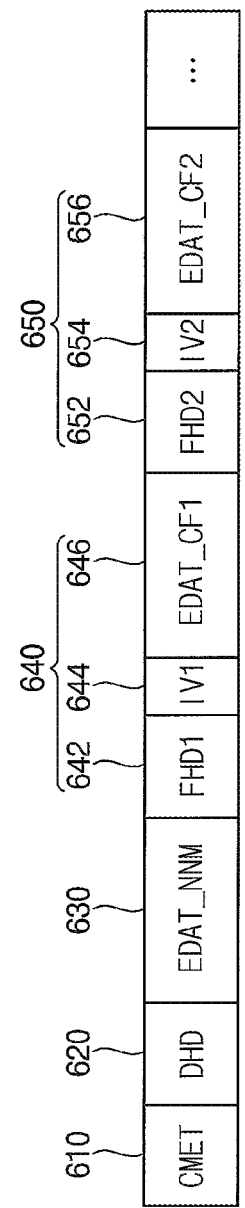
FIG. 8 is a diagram illustrating an example of a DRM package used in an operation of FIG. 7.

FIG. 8 is a diagram illustrating an example of a DRM package used in an operation of FIG. 7.

Referring to FIG. 8, a DRM package may include a contents metadata part 610, a DRM header part 620, a first data part 630, and a plurality of second data parts 640 and 650.

The contents metadata part 610 may include data structure information. For example, the contents metadata part 610 may include content metadata CMET that has structure information of all data required for the inference operation performed by the neural network model (e.g., the neural network model 542 in FIG. 7).

The DRM header part 620 may include key information. For example, the DRM header part 620 may include a DRM header DHD for generating a key that is used to decrypt the DRM package in the trusted execution environment.

The first data part 630 may include encrypted neural network model data EDAT_NNM. In the trusted execution environment, the encrypted neural network model data EDAT_NNM may be decrypted using the key, may be provided to the NPU (e.g., the NPU 540 in FIG. 7), and/or may be used for the computation.

The plurality of second data parts 640 and 650 may include the plurality of frame data. As described above, the plurality of frame data may be losslessly compressed and/or encrypted. In the trusted execution environment (TEE), the plurality of frame data may be decrypted using the key, and may be provided to the NPU. In addition, the plurality of frame data may be decompressed by the NPU, and may be used to perform the computation (e.g., convolution, matrix-vector calculation, etc.) for the inference operation together with the neural network model data as previously provided.

Each of the plurality of second data parts 640 and 650 may include a respective one of a plurality of frame header parts 642 and 652, a respective one of a plurality of initialization vector parts 644 and 654, and a respective one of a plurality of frame data parts 646 and 656. The plurality of frame header parts 642 and 652 may include frame headers FHD1 and FHD2, respectively. The plurality of initialization vector parts 644 and 654 may include AES initialization vectors IV1 and IV2, respectively. The plurality of frame data parts 646 and 656 may include lossless-compressed and encrypted frame data EDAT_CF1 and EDAT_CF2, respectively.

Figure 9A:
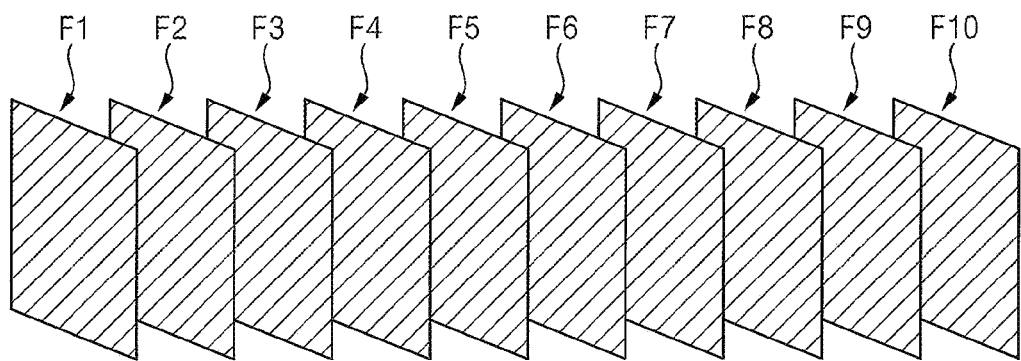
FIGS. 9A and 9B are diagrams for describing examples of an inference operation performed by a neural network model.
Figure 9B:
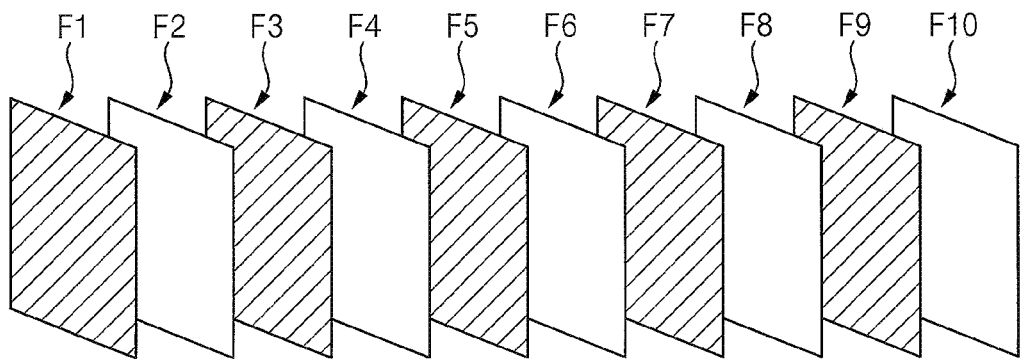

FIGS. 9A and 9B are diagrams for describing examples of an inference operation performed by a neural network model.

Referring to FIGS. 9A and 9B, a plurality of frame images F1, F2, F3, F4, F5, F6, F7, F8, F9, and F10, which correspond to the plurality of frame data provided to the neural network model 542 in FIG. 7, are illustrated. In FIGS. 9A and 9B, hatched frame images may represent images on which the inference operation is performed.

In some example embodiments, as illustrated in FIG. 9A, the inference operation may be performed on all of the plurality of frame images F1, F2, F3, F4, F5, F6, F7, F8, F9, and F10.

In some example embodiments, as illustrated in FIG. 9B, the inference operation may be performed on only some (and/or a part) of the plurality of frame images F1, F2, F3, F4, F5, F6, F7, F8, F9, and F10. Although FIG. 9B illustrates an example where the inference operation is performed on only odd-numbered frame images F1, F3, F5, F7, and F9, example embodiments are not limited thereto.

Figure 10:
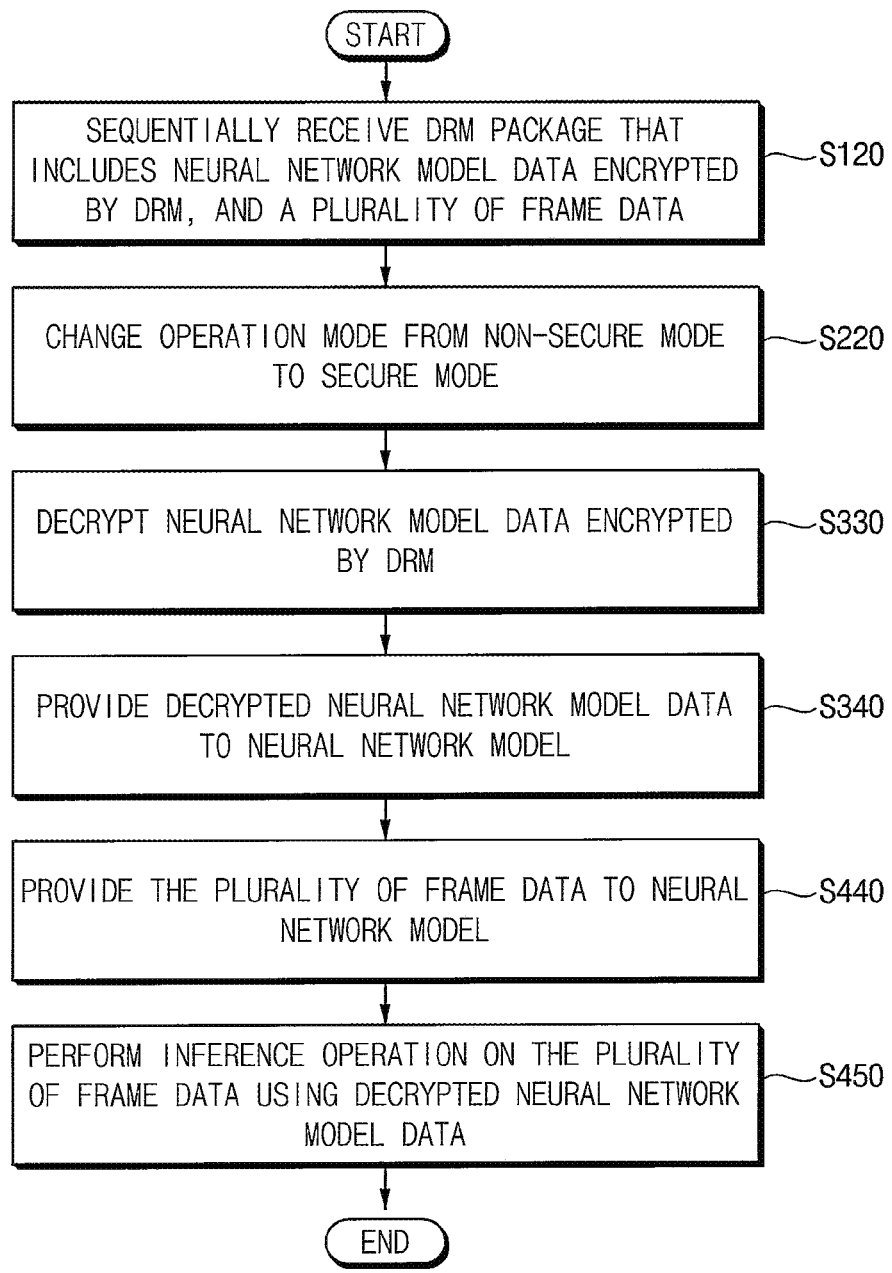
FIG. 10 is a flowchart illustrating another example of a method of operating a neural network model of FIG. 1.

FIG. 10 is a flowchart illustrating another example of a method of operating a neural network model of FIG. 1. The descriptions repeated with FIG. 6 will be omitted.

Referring to FIG. 10, an example where the neural network model data and the raw data are sequentially provided from an external device is illustrated.

For example, the neural network model data encrypted by the DRM may be provided as one DRM package, and the raw data may be provided after the DRM package is provided (e.g., from a different source and/or in another DRM package).

In addition, the raw data may include a plurality of frame data corresponding to a plurality of frame images. For example, the plurality of frame data may be provided in real time (or in online or during runtime) from an external image pickup device and/or may be provided in real time via a streaming service.

As in step S100 of FIG. 1, the DRM package and the plurality of frame data may be sequentially received (step S120). The DRM package may include the neural network model data encrypted by the DRM. Step S120 may be performed during the non-secure mode.

As in step S200 of FIG. 1, the operation mode may be changed from the non-secure mode to the secure mode based on a reception of the DRM package and the plurality of frame data (step S220). For example, in some embodiments, the operation mode may be initiated based on the reception of the DRM package.

As in step S300 of FIG. 1, the neural network model data that is included in the DRM package and encrypted by the DRM may be decrypted (step S330). The decrypted neural network model data may be provided to the neural network model (step S340). Steps S330 and S340 may be performed during the secure mode.

As in step S400 of FIG. 1, the plurality of frame data may be provided to the neural network model (step S440). The inference operation may be performed on the plurality of frame data using the decrypted neural network model data (step S450). Steps S440 and S450 may be performed during the secure mode. Though not illustrated, after the inference operation is completed, the electronic system may revert back to the non-secure mode.

Figure 11:
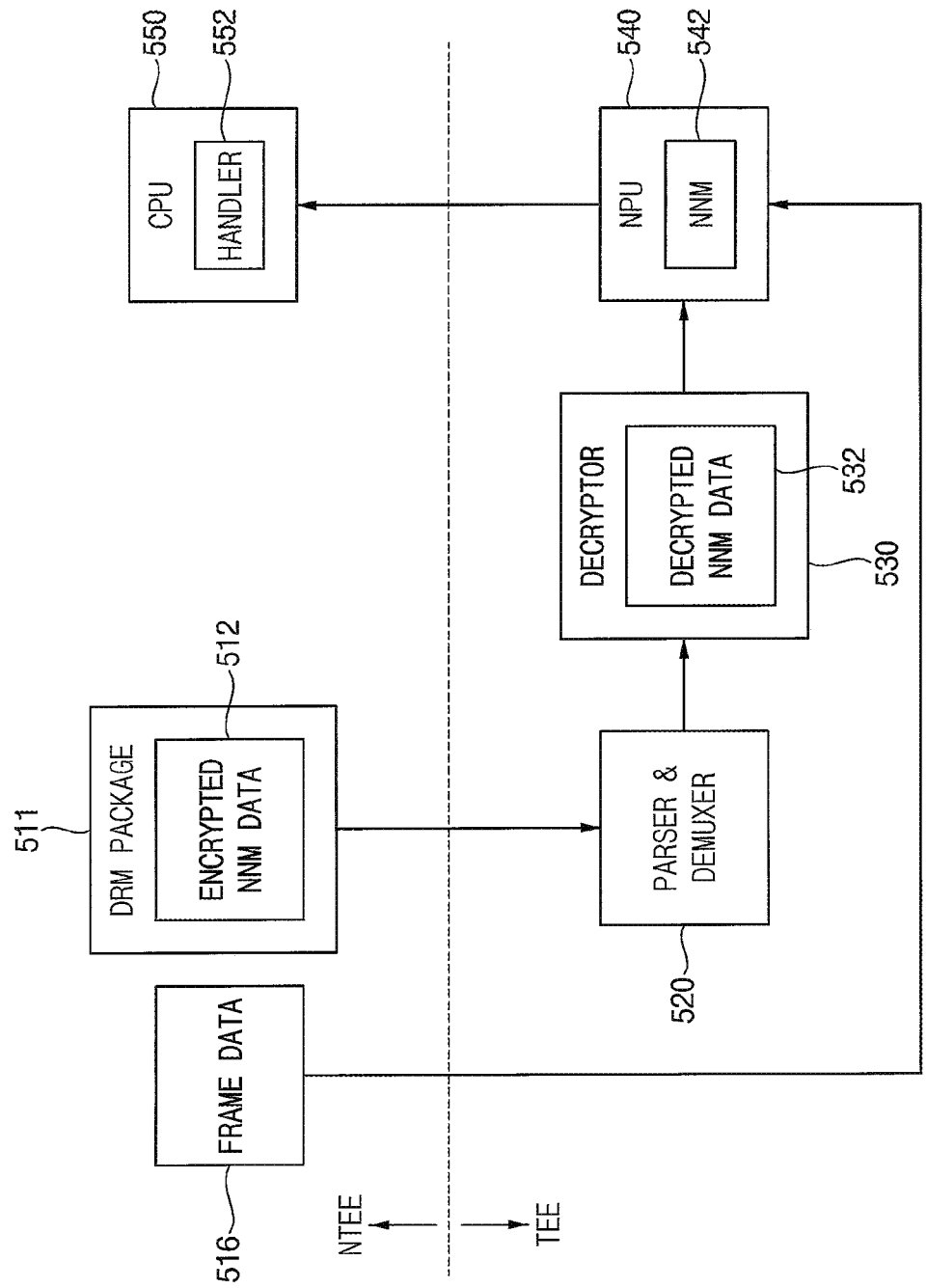
FIG. 11 is a diagram for describing a method of operating a neural network model of FIG. 10.

FIG. 11 is a diagram for describing a method of operating a neural network model of FIG. 10. The descriptions repeated with FIG. 7 will be omitted.

Referring to FIG. 11, a DRM package 511 and a plurality of frame data 516 may be received during the non-secure mode (e.g., in the non-trusted execution environment NTEE). The DRM package 511 may include encrypted neural network model data 512.

Based on a reception of the DRM package 511 and the plurality of frame data 516, the operation mode may be changed from the non-secure mode (e.g., the non-trusted execution environment NTEE) to the secure mode (e.g., the trusted execution environment TEE).

During the secure mode (e.g., in the trusted execution environment TEE), the DRM package 511 may be provided to a parser and demuxer 520 and a decryptor 530, and decrypted neural network model data 532 may be obtained. The decrypted neural network model data 532 may be provided to an NPU 540.

In addition, during the secure mode, the plurality of frame data 516 may be directly provided to the NPU 540.

In some example embodiments, for example when the plurality of frame data 516 are compressed by the lossless compression, the NPU 540 may decompress the plurality of frame data 516 and may provide a plurality of decompressed frame data as an input of the neural network model 542. In other example embodiments, for example when the plurality of frame data 516 are not compressed, the NPU 540 may provide the plurality of frame data 516 as an input of the neural network model 542 as the plurality of frame data 516 was received (e.g., directly providing the plurality of frame data 516 to the neural network model 542 without additional processing). The NPU 540 may perform the inference operation based on the decrypted neural network model data 532 and the plurality of frame data 516, and may output the result of the inference operation.

After the inference operation, the operation mode may be changed from the secure mode (e.g., the trusted execution environment TEE) to the non-secure mode (e.g., the non-trusted execution environment NTEE). During the non-secure mode (e.g., in the non-trusted execution environment NTEE) the result of the inference operation may be provided to a CPU 550 and a handler 552, and the CPU 550 and the handler 552 may perform the data processing operation based on the result of the inference operation.

Figure 12:
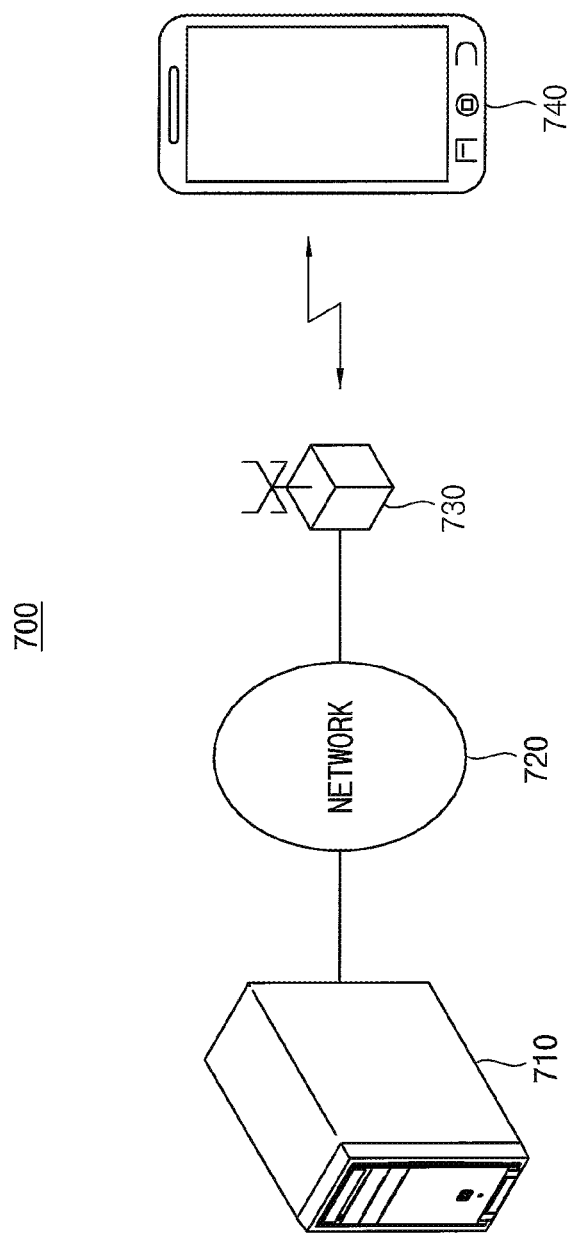
FIG. 12 is a diagram illustrating a system used for an operation of FIG. 11.

FIG. 12 is a diagram illustrating a system used for an operation of FIG. 11.

Referring to FIG. 12, a system 700 may include a service provider (and/or a server) 710, a network 720, a base station 730 and a mobile system 740.

In the system 700, a service area for providing the neural network model and related contents services may be divided into a plurality of cells, each of which has a predetermined size. The base station 730 may be arranged in each of the plurality of cells.

The mobile system 740 may be connected to the service provider 710 via the base station 730 and the network 720. For example, the mobile system 740 may be connected to the service provider 710 based on a WiFi communication and/or a wireless mobile communication. The mobile system 740 may perform the method of operating the neural network model (e.g., the method of FIG. 1) according to the example embodiments and/or may include the system-on-chip (e.g., the system-on-chip 100 of FIG. 2) according to the example embodiments.

In some example embodiments, the mobile system 740 may be any mobile system and/or any portable device. For example, the mobile system 740 may be and/or include at least one of a mobile phone, a smart phone, a tablet computer, a laptop computer, a personal digital assistants (PDA), a portable multimedia player (PMP), a digital camera, a portable game console, a music player, a camcorder, a video player, a navigation system, etc. The mobile system 740 may further be and/or include a wearable device, an internet of things (IoT) device, an internet of everything (IoE) device, an e-book reader, a virtual reality (VR) device, an augmented reality (AR) device, a robotic device, a drone, an automotive, etc.

Although not illustrated in FIG. 12, the mobile system 740 may be directly connected to the network 720 without the base station 730.

The service provider 710 may provide a DRM package (e.g., the DRM package 511 in FIG. 11) including encrypted neural network model data (e.g., the encrypted neural network model data 512 in FIG. 11) via an online service, market, and/or the like. In some example embodiments, the mobile system 740 may receive the DRM package from the service provider 710 and may receive a plurality of frame data (e.g., the plurality of frame data 516 in FIG. 11) in real time via a camera module, a streaming service, or the like, and may perform the operation illustrated in FIG. 11.

Figure 13:
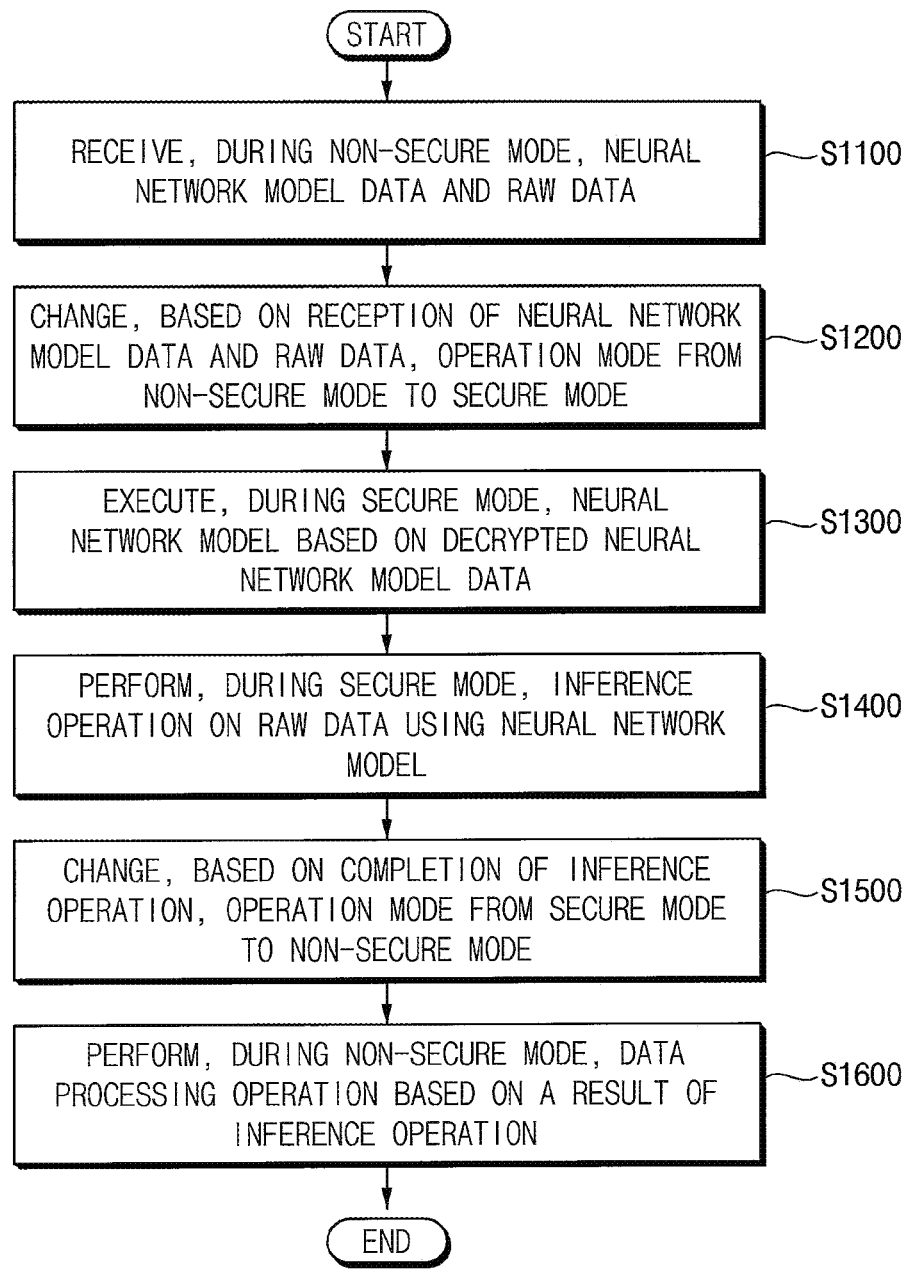
FIG. 13 is a flowchart illustrating a method of processing data according to example embodiments.

FIG. 13 is a flowchart illustrating a method of processing data according to example embodiments. The descriptions repeated with FIG. 1 will be omitted.

Referring to FIG. 13, in a method of processing data according to example embodiments, steps S1100, S1200, S1300, and S1400 may be substantially the same as steps S100, S200, S300, and S400 in FIG. 1, respectively.

Based on a completion of the inference operation, the operation mode is changed from the secure mode to the non-secure mode (step S500). During the non-secure mode, a data processing operation is performed based on a result of the inference operation (step S600). For example, as described with reference to FIGS. 7 and 11, the result of the inference operation may be provided from the NPU 540 and the neural network model 542 to the CPU 550 and the handler 552, and the CPU 550 and the handler 552 may perform the data processing operation.

As will be appreciated by those skilled in the art, the inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium and/or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 14:
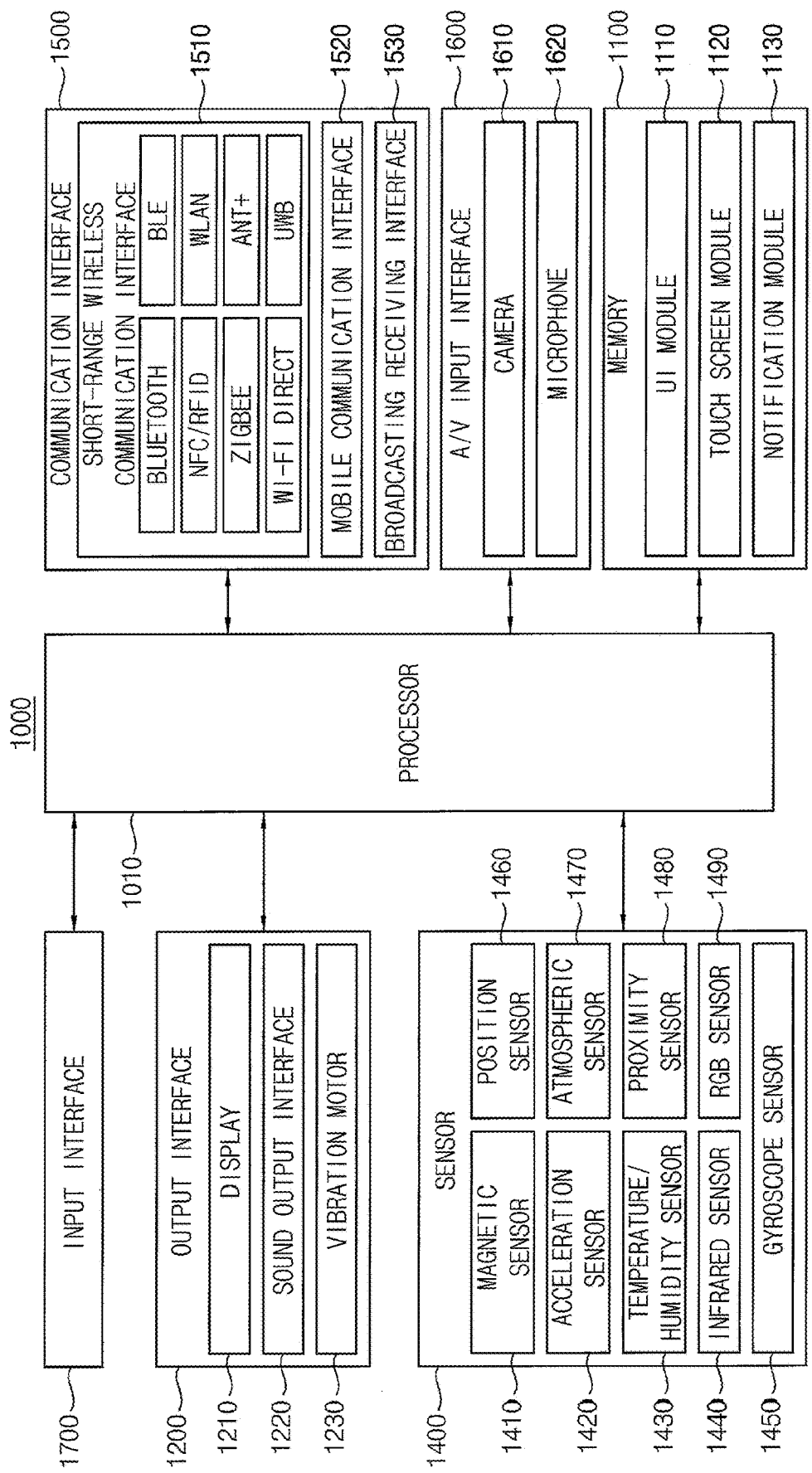
FIG. 14 is a block diagram illustrating an electronic system according to example embodiments.

FIG. 14 is a block diagram illustrating an electronic system according to example embodiments.

Referring to FIG. 14, an electronic system 1000 includes a processor 1010. The electronic system 1000 may further include a memory 1100, an output interface (e.g., including output circuitry) 1200, a sensor 1400, a communication interface (e.g., including communication circuitry) 1500, an audio/video (A/V) input interface (e.g., including A/V input circuitry) 1600, and an input interface (e.g., including input circuitry) 1700. As will be described with reference to FIG. 15, the electronic system 1000 may be an ADAS, an autonomous driving system, or the like, that is mounted, equipped, and/or installed in a vehicle.

The processor 1010 may include various processing circuitry and may control the general operations of the electronic system 1000. The processor 1010 may be implemented to perform the method of operating the neural network model according to, for example, the example embodiments, and may correspond to the first and second processors 110 and 120 in FIG. 2 and the processor 210 in FIG. 3.

The input interface 1700 may receive an input for controlling an operation of a module mounted in a vehicle. For example, the input interface 1700 may include a touch-pad, a switch, a keypad, and/or a keyboard. Though illustrated as a separate from the other interfaces, in some example embodiments, the input interface 1700 may be included in, as a part of, and/or coupled to the output interface 1200 and/or the audio/video interface 1600. For example, the input interface 1700 may be and/or include a touch-display and/or a microphone (e.g., a microphone 1620).

The output interface 1200 may include various circuitry to output an audio signal, a video signal, and/or a vibration signal (e.g., a haptic signal), and may include a display 1210, a sound output interface (e.g., including sound output circuitry and/or a speaker) 1220, and/or a vibration motor 1230. For example, the output interface 1200 may output a notification message as audio, video, and/or vibration.

The display 1210 may display and/or output information processed in the electronic system 1000. For example, the display 1210 may display a notification message on a head up display (HUD) of a vehicle. The sound output interface 1220 may include various circuitry to output audio data received from the communication interface 1500 and/or stored in the memory 1100. Also, the sound output interface 1220 may output a sound signal (e.g., a call signal reception sound, a message reception sound, a notification sound, etc.) related to functions performed in the electronic system 1000.

The processor 1010 may generally control the input interface 1700, the output interface 1200, the sensor 1400, the communication interface 1500, the A/V input interface 1600, or the like, by executing programs stored in the memory 1100. Also, the processor 1010 may perform the functions of the electronic system 1000, by executing the programs stored in the memory 1100.

The sensor 1400 may include various sensors and sensing circuitry to sense a state of the electronic system 1000, a state of a user, and/or a state around the electronic system 1000, and may transmit sensed information to the processor 1010.

The sensor 1400 may include various sensing circuitry, such as, for example, and without limitation, at least one of a magnetic sensor 1410, an acceleration sensor 1420, a temperature/humidity sensor 1430, an infrared sensor 1440, a gyroscope sensor 1450, a position sensor (e.g., global positioning system (GPS)) 1460, an atmospheric sensor 1470, a proximity sensor 1480, and/or an RGB sensor 1490, but is not limited thereto.

The communication interface 1500 may include various communication circuitry including at least one component configured to enable the electronic system 1000 to communicate with another electronic system (not illustrated) and/or a server (not illustrated). The other electronic system may be a computing device and/or a sensor, but is not limited thereto. For example, the communication interface 1500 may include a short-range wireless communication interface 1510, a mobile communication interface 1520, and/or a broadcasting receiving interface 1530.

The short-range wireless communication interface 1510 may include, for example, at least one of a Bluetooth communication interface, a Bluetooth low energy (BLE) communication interface, a near-field communication and/or radio frequency identification (NFC/RFID) interface, wireless local area network (WLAN) (e.g., Wi-fi) communication interface, a mesh-network (such as Zigbee) communication interface, an infrared data association (IrDA) communication interface (not illustrated), a Wi-fi direct (WFD) communication interface, a ultra wideband (UWB) communication interface, a wireless sensor network (such as ANT and/or ANT+) communication interface, and/or the like, but is not limited thereto.

The A/V input interface 1600 may include various A/V interface circuitry and is configured to input an audio signal and/or a video signal, and may include a camera 1610, a microphone 1620, and/or the like. The camera 1610 may obtain an image frame, such as a still image and/or a video, via an image sensor, in a videotelephony mode and/or a photographing mode. The image captured by the image sensor may be processed by the processor 1010 or an additional image processor (not illustrated).

The microphone 1620 may receive an external sound signal and process the external sound signal as electrical sound data. For example, the microphone 1620 may receive the sound signal from an external device and/or the user. In some embodiments, various noise-removal algorithms may be used to remove noise generated in a process of receiving the external sound signal. For example, at least one of the A/V input interface 1600, the microphone 1620, and/or the processor 1010 may be configured to remove noise from the external sound signal.

The memory 1100 may store programs for the processing and controlling operations of the processor 1010, and/or may store data that is input to the electronic system 1000 and/or output from the electronic system 1000.

The memory 1100 may include at least one type of storage medium from among a flash memory type, a hard disk type, a multimedia card micro type. The programs stored in the memory 1100 may be divided into a plurality of modules based on their functions. For example, the programs may be divided into a user interface (UI) module 1110, a touch screen module 1120, and a notification module 1130.

The UI module 1110 may provide a specialized UI, a graphic user interface (GUI), etc., which are synchronized to the electronic system 1000, for each application. The touch screen module 1120 may receive a touch gesture (e.g., from on a touch screen) via an input by the user, and transmit information related to the touch gesture to the processor 1010. The touch screen module 1120 may be implemented as additional hardware including an electronic controller and/or processing circuitry.

The notification module 1130 may generate a signal to notify about an occurrence of an event. The notification module 1130 may output the notification signal as a video signal via the display 1210, as an audio signal via the sound output interface 1220, and/or as a vibration signal via the vibration motor 1230.

Figure 15:
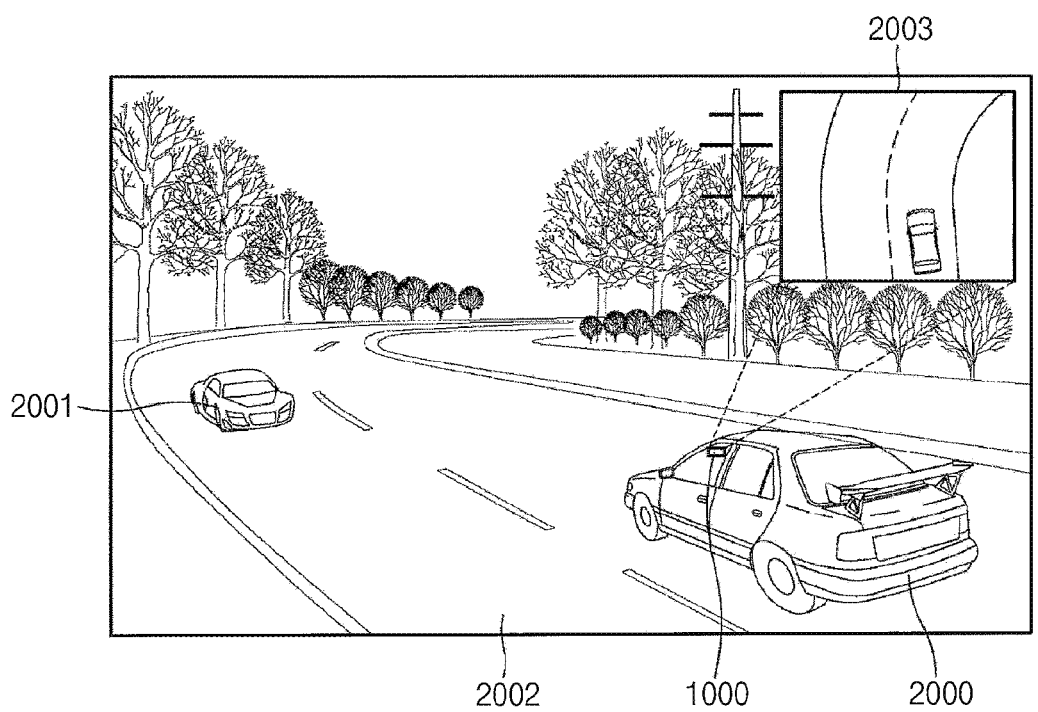
FIG. 15 is a diagram illustrating an example in which an electronic system according to example embodiments is mounted on a vehicle.

FIG. 15 is a diagram illustrating an example in which an electronic system according to example embodiments is mounted on a vehicle.

Referring to FIG. 15, an electronic system 1000 may be an ADAS, an autonomous driving system, and/or the like, that is included (e.g., mounted) in a vehicle 2000. The electronic system 1000 may include various instances of circuitry and components configured to receive a video sequence including a stereo image, reflected waves (e.g., reflected electromagnetic waves), and/or reflected lights from a camera mounted in the vehicle 2000 and determine occurrence of various events associated with the vehicle 2000. The various events may include object detection, object tracking, and/or scene segmentation. The electronic system 1000 may generate an output signal that includes a notification message that may be presented to an occupant (e.g., user) of the vehicle 2000 via one or more user interfaces of the vehicle 2000 based on a determined occurrence of one or more events. The determination of an occurrence of the one or more events may be, for example, based on the inference operation discussed in the above example embodiments. The electronic system 1000 may generate an output signal that causes a vehicle control system of the vehicle 2000 to control one or more driving elements of the vehicle 2000 to control the driving (e.g., driving trajectory) of the vehicle 2000, based on a determined occurrence of one or more events.

While it is described that the electronic system 1000 receives the video sequence from the camera mounted in the vehicle 2000, example embodiments are not limited thereto. The electronic system 1000 may receive the video sequence from a camera to capture a surrounding environment of the vehicle 2000. The surrounding environment of the vehicle 2000 (also referred to herein as a driving environment associated with the vehicle 2000) may include, for example, a front side, lateral sides, and a rear side.

In some example embodiments, the electronic system 1000 may detect an event based on location of the event by tracking a bounding box (not illustrated) designating the object and thus, may differently recognize levels of importance of a type of object based on locations thereof, thereby determining whether an event occurs based on the locations of the object.

In some example embodiments, the electronic system 1000 may detect at least one video sequence (or, a stereo image) 2003 including an object, from among a plurality of video sequences, and may obtain radar reflected waves (e.g., reflected electromagnetic waves) and/or reflected lights (not illustrated). Reflected waves may be reflected from one or more objects located in the surrounding environment (e.g., driving environment) and may be captured at one or more sensors at the vehicle 2000. The electronic system 1000 may detect a road 2002 including a fixed pattern and/or another vehicle 2001 moving according to a time and/or distance, by analyzing the at least one video sequence 2003. In some example embodiments, the electronic system 1000 may determine occurrence of an event based on detection of the other vehicle 2001, by analyzing a location of the other vehicle 2001 by analyzing a coordinate of the other vehicle 2001 in the at least one video sequence 2003. For example, an event may include the other vehicle 2001 slowing, turning, stopping, indicating an intent (e.g., using a turn signal and/or a brake light) and/or drifting. The electronic system 1000 may further, based on the determination, generate an output signal that, when processed by a control system of the vehicle 2000, causes a particular notification message to be presented to an occupant of the vehicle 2000 via a user interface of the vehicle 2000 and/or causes driving of the vehicle 2000 to be controlled to cause the vehicle 2000 to be driven along a particular driving path (e.g., driving trajectory) through the surrounding environment (e.g., autonomous driving, driving the vehicle 2000 as an autonomous vehicle, etc.).

In some example embodiments, the vehicle 2000 may include any means of transportation, such as, for example, and without limitation, an automobile, a bus, a truck, a train, a bicycle, a motorcycle, and/or the like, and/or may provide a communication function, a data processing function, and/or a transportation function.

Figure 16:
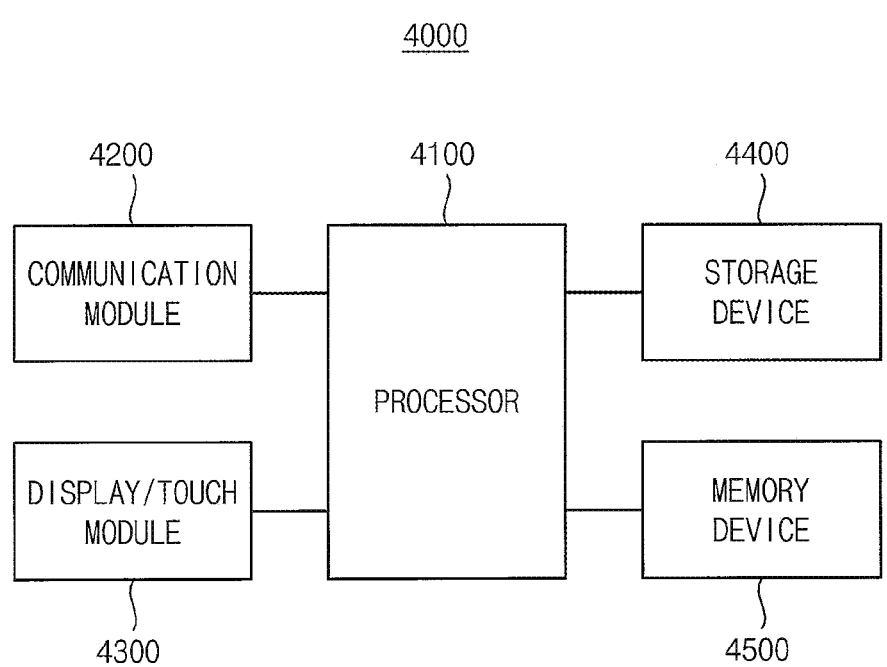
FIG. 16 is a block diagram illustrating an electronic system according to example embodiments.

FIG. 16 is a block diagram illustrating an electronic system according to example embodiments.

Referring to FIG. 16, an electronic system 4000 includes at least one processor 4100, a communication module 4200, a display/touch module 4300, a storage device 4400, and a memory device 4500. For example, the electronic system 4000 may be any mobile system and/or any computing system.

The processor 4100 controls operations of the electronic system 4000. The processor 4100 may execute an operating system and at least one application to provide an internet browser, games, videos, and/or the like. The communication module 4200 may perform wireless and/or wire communications with an external system. The display/touch module 4300 displays data processed by the processor 4100 and/or receives data through a touch panel. In some embodiments, the display/touch module may be, be included in, and/or include an input interface (not illustrated). The storage device 4400 stores user data. The memory device 4500 temporarily stores data used for processing operations of the electronic system 4000. The storage device 4400 and/or the memory device 4500 may, for example, in a computer readable storage medium, and though illustrated as separate, may be included in the same and/or different storage medium. The processor 4100 may be implemented to perform the method of operating the neural network model according to example embodiments, and may correspond to the first and second processors 110 and 120 in FIG. 2 and the processor 210 in FIG. 3.

The inventive concepts may be applied to various electronic devices and systems in which the neural network models and/or systems are executed or driven. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The foregoing is illustrative of some example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating an electronic device including a neural network model, the method comprising:
   receiving, during a non-secure mode of the electronic device, neural network model data and raw data, the neural network model data encrypted by digital rights management (DRM) and the raw data includes a plurality of frame data corresponding to a plurality of frame images;
   changing, based on the receiving the neural network model data and the raw data, an operation mode of the electronic device from the non-secure mode to a secure mode;
   decrypting, during the secure mode, the neural network model data encrypted by the DRM based on an authentication or verification of a license obtained by the electronic device;
   executing, during the secure mode, the neural network model based on decrypted neural network model data; and
   performing, during the secure mode, an inference operation on the raw data using the executed neural network model,
   wherein the neural network model data encrypted by the DRM is received as a first DRM package,
   the decrypting the neural network model data includes decrypting the neural network model data included in the first DRM package, and
   the inference operation is performed on the plurality of frame data using the decrypted neural network model data.

2. The method of claim 1, wherein the neural network model data and the raw data are simultaneously received from an external device.

3. The method of claim 2, wherein
   the raw data is encrypted by the DRM, and
   the neural network model data encrypted by the DRM and the raw data encrypted by the DRM are integrated with each other and are received as the first DRM package.

4. The method of claim 1, wherein the plurality of frame data are compressed by lossless compression.

5. The method of claim 4, further comprising:
   decompressing the plurality of frame data that are compressed by the lossless compression,
   wherein the decrypting of the neural network model data includes decrypting the neural network model data and the raw data included in the first DRM package, and
   the inference operation is performed on the plurality of decompressed frame data using the decrypted neural network model data.

6. The method of claim 1, wherein the first DRM package includes
   a contents metadata part including data structure information;
   a DRM header part including key information for decrypting the DRM;
   a first data part including the neural network model data encrypted by the DRM; and
   a plurality of second data parts including the plurality of frame data.

7. The method of claim 6, wherein each of the plurality of second data parts includes a frame header part, an initialization vector part, and a frame data part.

8. The method of claim 1, wherein the inference operation is performed on all of the plurality of frame data.

9. The method of claim 1, wherein the inference operation is performed on only a part of the plurality of frame data.

10. The method of claim 1, wherein the neural network model data and the raw data are sequentially received from an external device.

11. The method of claim 10, wherein
the raw data is received after the first DRM package is received.

12. The method of claim 1, wherein the neural network model includes at least one of an artificial neural network (ANN) system, a convolutional neural network (CNN) system, a recurrent neural network (RNN) system, or a deep neural network (DNN) system.

13. A method of processing data, the method comprising:
receiving, during a non-secure mode of an electronic device, neural network model data and raw data, the neural network model data encrypted by digital rights management (DRM) and the raw data includes a plurality of frame data corresponding to a plurality of frame images;
changing, based on receiving the neural network model data and the raw data, an operation mode of the electronic device from the non-secure mode to a secure mode;
decrypting, during the secure mode, the neural network model data encrypted by the DRM based on an authentication or verification of a license obtained by the electronic device;
executing, during the secure mode, the neural network model based on the decrypted neural network model data;
performing, during the secure mode, an inference operation on the raw data using the executed neural network model;
changing, based on a completion of the inference operation, the operation mode from the secure mode to the non-secure mode; and
performing, during the non-secure mode, a data processing operation based on a result of the inference operation,
wherein the neural network model data encrypted by the DRM is received as a first DRM package,
the decrypting the neural network model data includes decrypting the neural network model data included in the first DRM package, and
the inference operation is performed on the plurality of frame data using the decrypted neural network model data.

14. The method of claim 13, wherein
the data processing operation is performed by a first processor, and
the inference operation is performed by a second processor different from the first processor.

15. The method of claim 14, wherein
the first processor includes a central processing unit (CPU), and
the second processor includes a neural processing unit (NPU).

16. The method of claim 13, wherein the secure mode is executed based on peripheral isolation technology.

17. A method of operating a neural network model, neural network model including a convolutional neural network (CNN), the method comprising:
receiving, during a non-secure mode, a first digital rights management (DRM) package and a plurality of frame data,
the first DRM package including neural network model data and is encrypted by DRM,
the plurality of frame data corresponding to a plurality of frame images and are compressed by lossless compression and encrypted by the DRM;
changing, based on the receiving the first DRM package, an operation mode from the non-secure mode to a secure mode;
decrypting, during the secure mode, the neural network model data and the plurality of frame data;
providing, during the secure mode, the decrypted neural network model data and a plurality of decrypted frame data to a neural processing unit (NPU);
decompressing, during the secure mode and by the NPU, the plurality of decrypted frame data;
performing, during the secure mode, an inference operation on the plurality of frame data using the decrypted neural network model data as parameters of the neural network model and a plurality of decompressed frame data as input feature map data;
changing, based on a completion of the inference operation, the operation mode from the secure mode to the non-secure mode; and
performing, during the non-secure mode, a data processing operation based on a result of the inference operation, and
wherein the CNN performs the inference operation on the plurality of frame data.

* * * * *